(12) United States Patent
Zou et al.

(10) Patent No.: US 11,599,818 B2
(45) Date of Patent: Mar. 7, 2023

(54) APPARATUS AND METHOD INCLUDING SCALABLE REPRESENTATIONS OF ARBITRARY QUANTUM COMPUTING ROTATIONS

(71) Applicant: Intel Corporation, Santa Clara, CA (US)

(72) Inventors: Xiang Zou, Hillsboro, OR (US); Shavindra Premaratne, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 16/714,663

(22) Filed: Dec. 13, 2019

(65) Prior Publication Data

US 2021/0182725 A1 Jun. 17, 2021

(51) Int. Cl.
*G06N 10/00* (2022.01)

(52) U.S. Cl.
CPC ................... *G06N 10/00* (2019.01)

(58) Field of Classification Search
None
See application file for complete search history.

(56) References Cited

U.S. PATENT DOCUMENTS

2019/0042973 A1 2/2019 Zou et al.

OTHER PUBLICATIONS

Wiebe, Nathan, and Vadym Kliuchnikov. "Floating point representations in quantum circuit synthesis." New Journal of Physics 15.9 (2013): 093041. (Year: 2013).*
European Search Report and Search Opinion, EP App. No. 20198150. 3, dated Mar. 22, 2021, 09 pages.
Chong et al., "Programming languages and compiler design for realistic quantum hardware", Nature, vol. 549, Sep. 14, 2017, pp. 180-187.
Cross et al., "Open Quantum Assembly Language", arXiv:1707. 03429v2 [quant-ph], Jan. 10, 2017, pp. 1-24.
Fu et al., "A Heterogeneous Quantum Computer Architectur", Proceedings of the ACM International Conference on Computing Frontiers, May 16-18, 2016, pp. 323-330.
Fu et al., "A Microarchitecture for a Superconducting Quantum Processor", IEEE Micro, vol. 38, No. 3, May/Jun. 2018, pp. 40-47.
O'Malley et al., "Scalable Quantum Simulation of Molecular Energies", Physical Review X, vol. 6, 2016, pp. 031007-1-031007-13.

* cited by examiner

*Primary Examiner* — Jany Richardson
(74) *Attorney, Agent, or Firm* — Nicholson De Vos Webster & Elliott LLP

(57) ABSTRACT

Apparatus and method for performing a quantum rotation operation. For example, one embodiment of an apparatus comprises: a decoder to decode a plurality of instructions; execution circuitry to execute a first instruction or first set of the instructions to generate a floating point (FP) value and to store the FP value in a first register; the execution circuitry to execute a second instruction or second set of the one or more of the instructions to read the FP value from the first register and compress the FP value to generate a compressed FP value having a precision selected for performing quantum rotation operations; and quantum interface circuitry to process the compressed FP value to cause a quantum rotation to be performed on one or more qubits of a quantum processor.

24 Claims, 25 Drawing Sheets

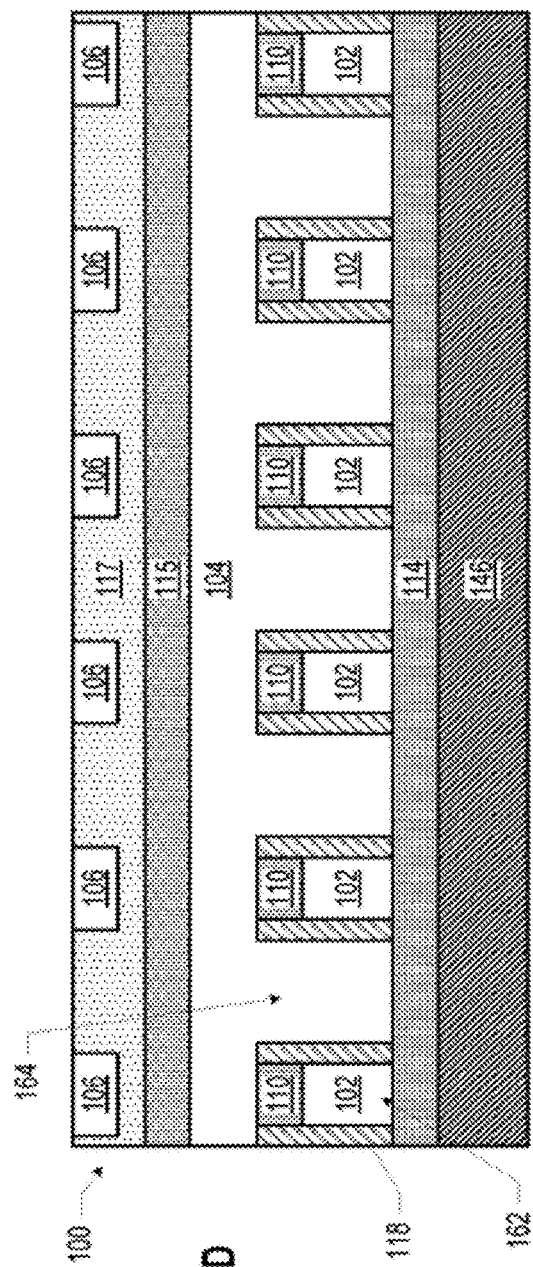
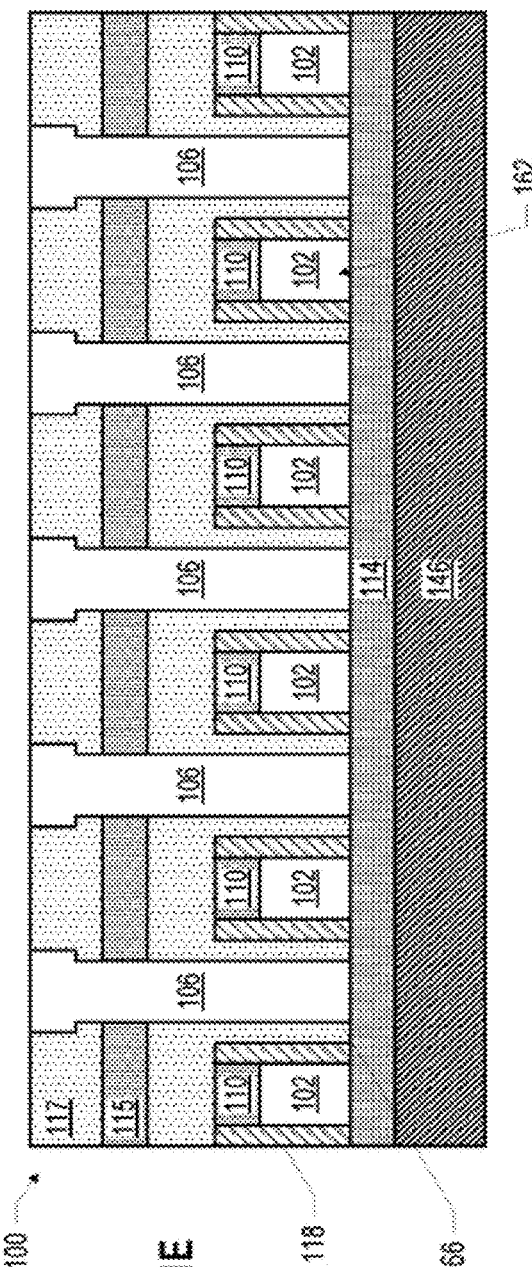
FIG. 1D
FIG. 1E

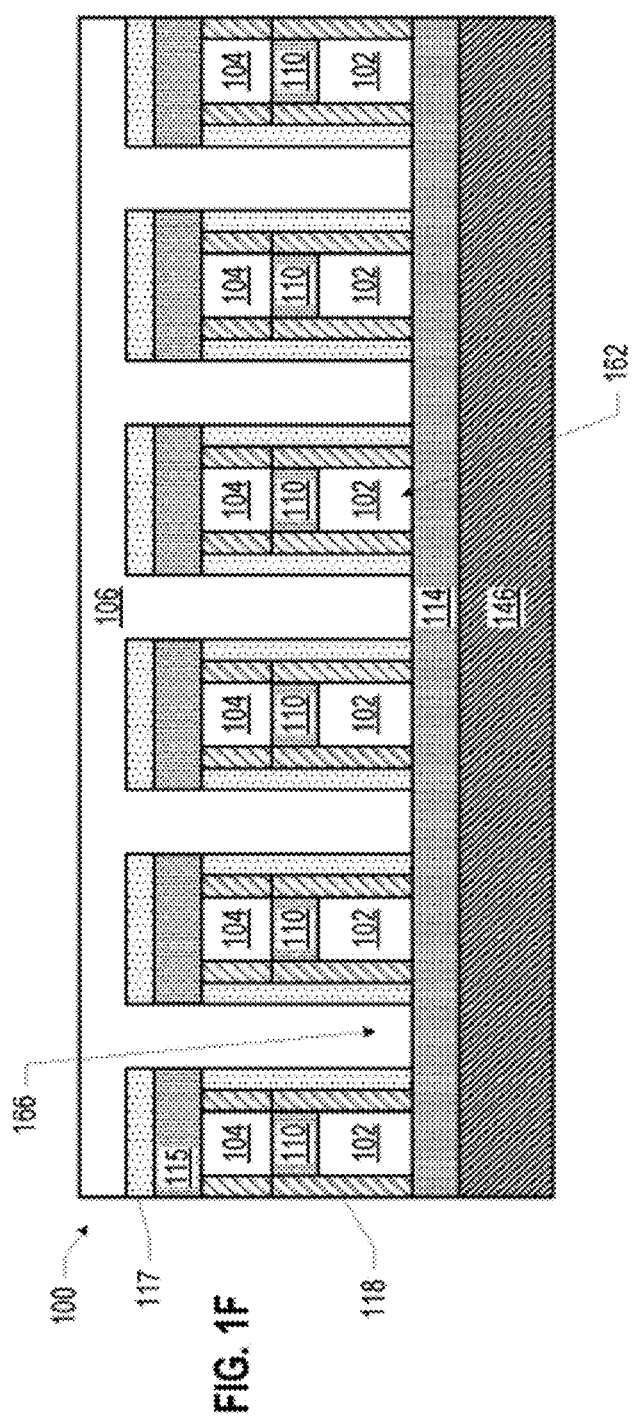

```
for k from 0 to NR-1 do
  for i from 0 to NQ-1 do
    h_x[i] ← random real number within [-1,1]    # floating point op
    h_y[i] ← random real number within [-1,1]    # floating point op
    a[i] ← 0
  end for
  for j from 0 to NP-1 do
    for i from 0 to NQ-1 do
      Initialize(q[i])                            # quantum op, "Qu-Op Analog Signal Generator"
    end for
    prep params (h_x, h_y, ...)                   # floating point op
    for i from 0 to NT-1 do
      Q(params)     # Figure 3, "Quantum circuit for many-body disordered Hamiltonian"
    end for
    for i from 0 to NQ-1 do
      a[i] ← a[i] + Measure(q[i])                 # quantum op, "Qubit measurement"
    end for
  end for
  for i from 0 to NQ-1 do
    Pr[i] ← a[i] / NP;                            # floating point op
  end for
  compute system properties from Pr.              # floating point op
end for
```

*FIG. 5B*

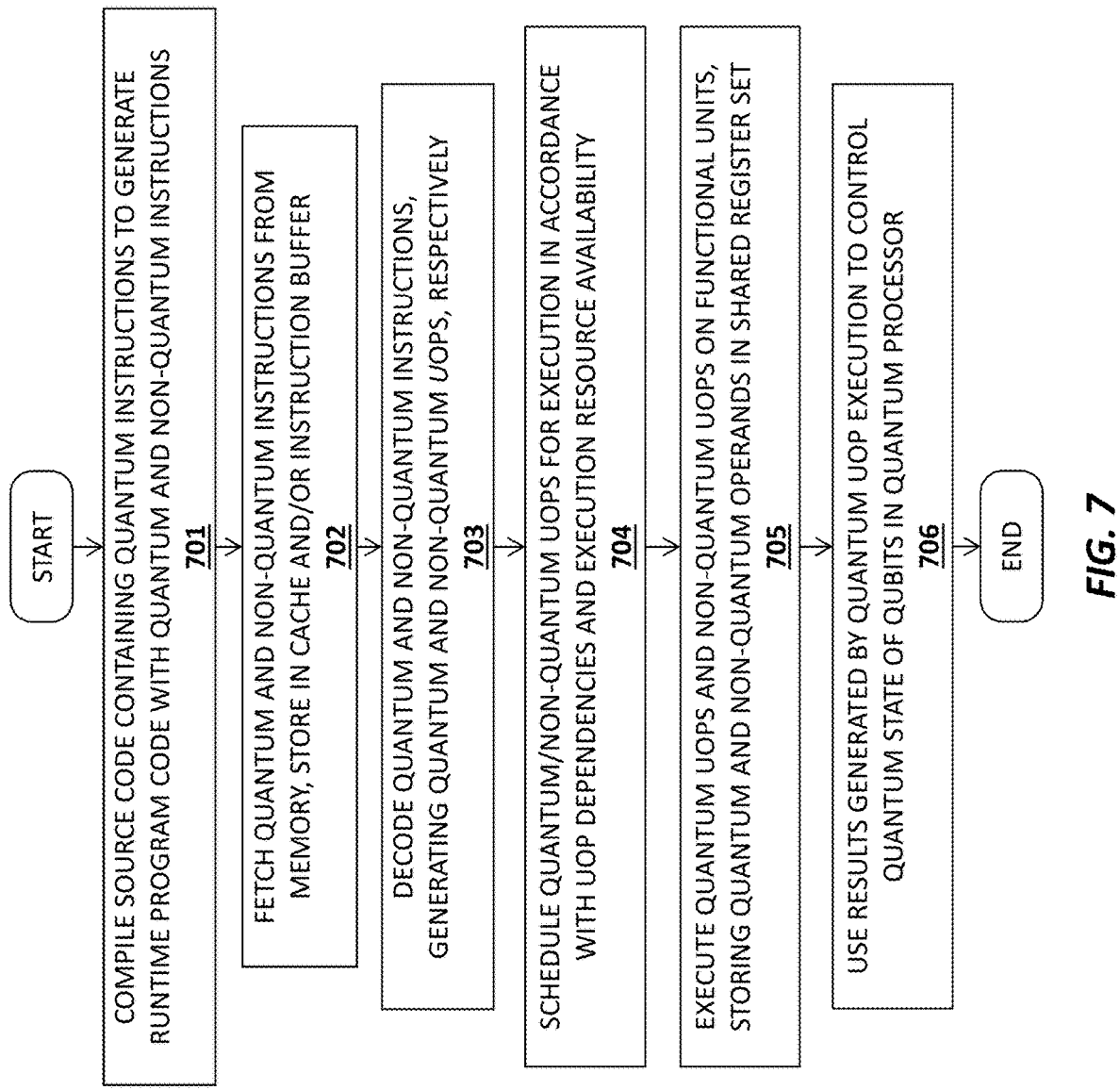

Parameters:
$w, \tau, h_0^x, h_0^z, h_1^x, h_1^z$ cNOT $q1, q0$
in parallel do
  $R_z(2w h_0^z \tau)\ q0$
  $R_z(2\tau)\ q1$
end do
$cR_x(4\tau)\ q0, q1$
cNOT $q1, q0$
$R_z(2w h_1^z \tau)\ q0$
in parallel do
  $R_z(2w h_0^x \tau)\ q0$    1501
  $R_z(2w h_1^x \tau)\ q1$
end do

*FIG. 15*

APPARATUS AND METHOD INCLUDING SCALABLE REPRESENTATIONS OF ARBITRARY QUANTUM COMPUTING ROTATIONS

BACKGROUND

Field of the Invention

The embodiments of the invention relate generally to the field of quantum computing. More particularly, these embodiments relate to an apparatus and method including scalable representations of arbitrary quantum computing rotations.

Description of the Related Art

Quantum computing refers to the field of research related to computation systems that use quantum mechanical phenomena to manipulate data. These quantum mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

BRIEF DESCRIPTION OF THE DRAWINGS

A better understanding of the present invention can be obtained from the following detailed description in conjunction with the following drawings, in which:

FIGS. 1A-1F illustrate various views of an example quantum dot device, in accordance with one embodiment;

FIGS. 5A-B illustrate an example quantum circuit and program code to implement the quantum circuit;

FIG. 7 illustrates a method in accordance with one embodiment of the invention;

FIG. 15 illustrates an example code sequence for qubit rotations;

DETAILED DESCRIPTION

Figure 1A:
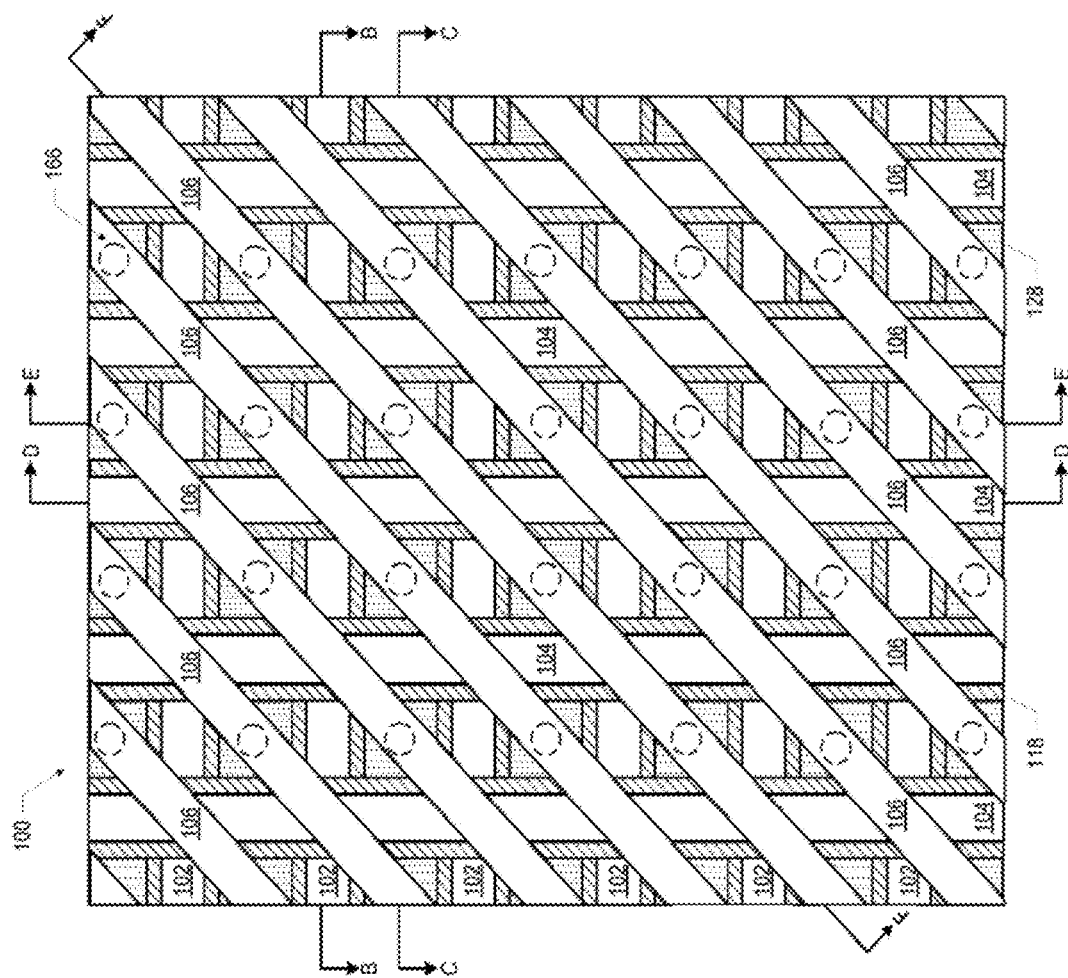

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

INTRODUCTION

A quantum computer uses quantum-mechanical phenomena such as superposition and entanglement to perform computations. In contrast to digital computers which store data in one of two definite states (0 or 1), quantum computation uses quantum bits (qbits), which can be in superpositions of states. Qbits may be implemented using physically distinguishable quantum states of elementary particles such as electrons and photons. For example, the polarization of a photon may be used where the two states are vertical polarization and horizontal polarization. Similarly, the spin of an electron may have distinguishable states such as "up spin" and "down spin."

Qbit states are typically represented by the bracket notations |0> and |1>. In a traditional computer system, a bit is exclusively in one state or the other, i.e., a '0' or a '1.' However, qbits in quantum mechanical systems can be in a superposition of both states at the same time, a trait that is unique and fundamental to quantum computing.

Quantum computing systems execute algorithms containing quantum logic operations performed on qubits. The sequence of operations is statically compiled into a schedule and the qubits are addressed using an indexing scheme. This algorithm is then executed a sufficiently large number of times until the confidence interval of the computed answer is above a threshold (e.g., ~95+%). Hitting the threshold means that the desired algorithmic result has been reached.

Qbits have been implemented using a variety of different technologies which are capable of manipulating and reading quantum states. These include, but are not limited to quantum dot devices (spin based and spatial based), trapped-ion devices, superconducting quantum computers, optical lattices, nuclear magnetic resonance computers, solid-state NMR Kane quantum devices, electrons-on-helium quantum computers, cavity quantum electrodynamics (CQED) devices, molecular magnet computers, and fullerene-based ESR quantum computers, to name a few. Thus, while a quantum dot device is described below in relation to certain embodiments of the invention, the underlying principles of the invention may be employed in combination with any type of quantum computer including, but not limited to, those listed above. The particular physical implementation used for qbits is orthogonal to the embodiments of the invention described herein.

Quantum Dot Devices

Quantum dots are small semiconductor particles, typically a few nanometers in size. Because of this small size, quantum dots operate according to the rules of quantum mechanics, having optical and electronic properties which differ from macroscopic entities. Quantum dots are sometimes referred to as "artificial atoms" to connote the fact that a quantum dot is a single object with discrete, bound electronic states, as is the case with atoms or molecules.

Figure 1B:
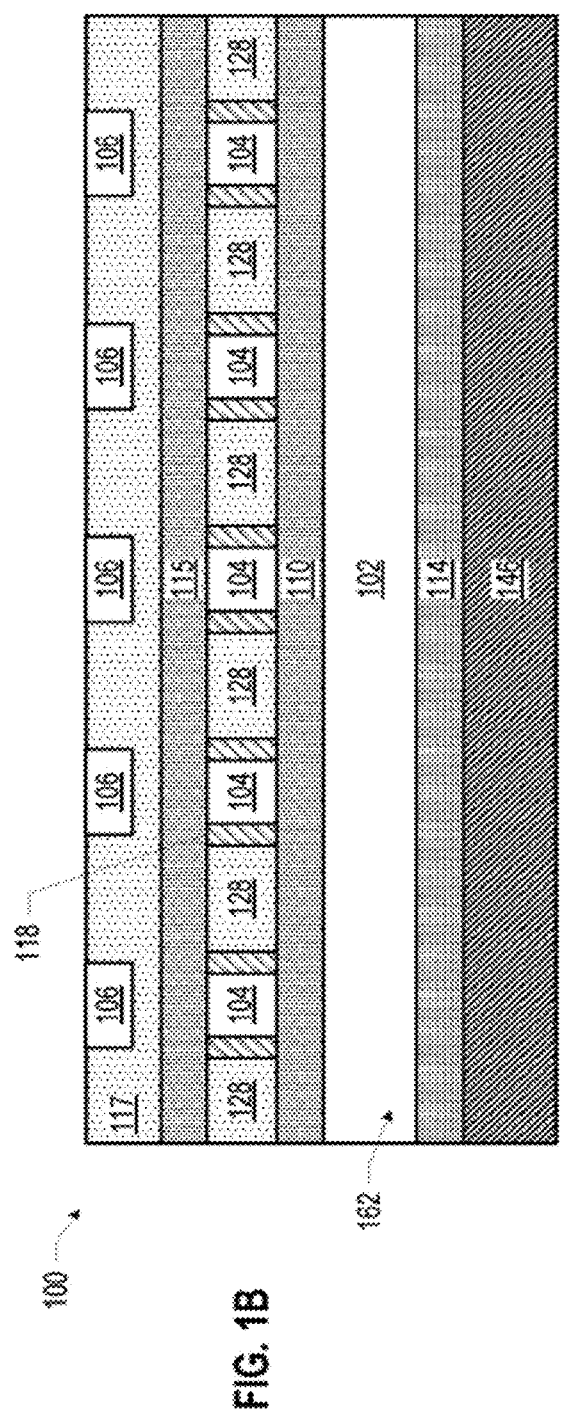
Figure 1C:
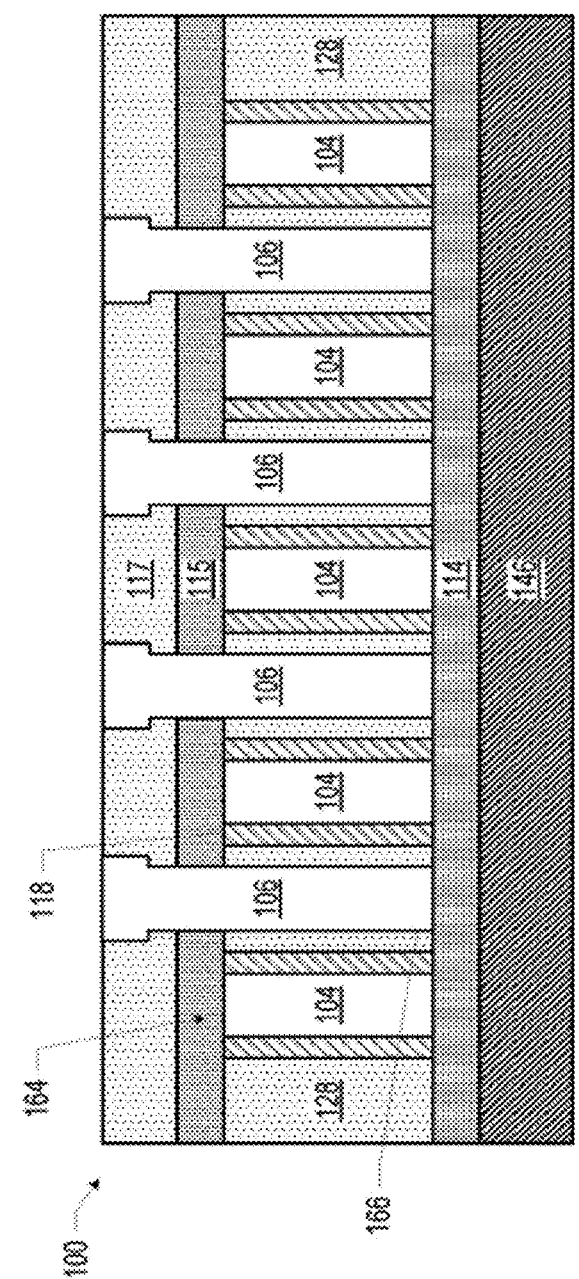

FIGS. 1A-1F are various views of a quantum dot device 100, which may be used with embodiments of the invention described below. FIG. 1A is a top view of a portion of the quantum dot device 100 with some of the materials removed so that the first gate lines 102, the second gate lines 104, and the third gate lines 106 are visible. Although many of the drawings and description herein may refer to a particular set of lines or gates as "barrier" or "quantum dot" lines or gates, respectively, this is simply for ease of discussion, and in other embodiments, the role of "barrier" and "quantum dot" lines and gates may be switched (e.g., barrier gates may instead act as quantum dot gates, and vice versa). FIGS. 1B-1F are side cross-sectional views of the quantum dot device 100 of FIG. 1A; in particular, FIG. 1B is a view through the section B-B of FIG. 1A, FIG. 1C is a view through the section C-C of FIG. 1A, FIG. 1D is a view through the section D-D of FIG. 1A, FIG. 1E is a view through the section E-E of FIG. 1A, and FIG. 1F is a view through the section F-F of FIG. 1A.

The quantum dot device 100 of FIG. 1 may be operated in any of a number of ways. For example, in some embodiments, electrical signals such as voltages, currents, radio frequency (RF), and/or microwave signals, may be provided to one or more first gate line 102, second gate line 104, and/or third gate line 106 to cause a quantum dot (e.g., an electron spin-based quantum dot or a hole spin-based quantum dot) to form in a quantum well stack 146 under a third gate 166 of a third gate line 106. Electrical signals provided to a third gate line 106 may control the electrical potential of a quantum well under the third gates 166 of that third gate line 106, while electrical signals provided to a first gate line 102 (and/or a second gate line 104) may control the potential energy barrier under the first gates 162 of that first gate line 102 (and/or the second gates 164 of that second gate line 104) between adjacent quantum wells. Quantum interactions between quantum dots in different quantum wells in the quantum well stack 146 (e.g., under different quantum dot gates) may be controlled in part by the potential energy barrier provided by the barrier potentials imposed between them (e.g., by intervening barrier gates).

Generally, the quantum dot devices 100 disclosed herein may further include a source of magnetic fields (not shown) that may be used to create an energy difference in the states of a quantum dot (e.g., the spin states of an electron spin-based quantum dot) that are normally degenerate, and the states of the quantum dots (e.g., the spin states) may be manipulated by applying electromagnetic energy to the gates lines to create quantum bits capable of computation. The source of magnetic fields may be one or more magnet lines, as discussed below. Thus, the quantum dot devices 100 disclosed herein may, through controlled application of electromagnetic energy, be able to manipulate the position, number, and quantum state (e.g., spin) of quantum dots in the quantum well stack 146.

In the quantum dot device 100 of FIG. 1, a gate dielectric 114 may be disposed on a quantum well stack 146. A quantum well stack 146 may include at least one quantum well layer 152 (not shown in FIG. 1) in which quantum dots may be localized during operation of the quantum dot device 100. The gate dielectric 114 may be any suitable material, such as a high-k material. Multiple parallel first gate lines 102 may be disposed on the gate dielectric 114, and spacer material 118 may be disposed on side faces of the first gate lines 102. In some embodiments, a patterned hardmask 110 may be disposed on the first gate lines 102 (with the pattern corresponding to the pattern of the first gate lines 102), and the spacer material 118 may extend up the sides of the hardmask 110, as shown. The first gate lines 102 may each be a first gate 162. Different ones of the first gate lines 102 may be electrically controlled in any desired combination (e.g., each first gate line 102 may be separately electrically controlled, or some or all the first gate lines 102 may be shorted together in one or more groups, as desired).

Multiple parallel second gate lines 104 may be disposed over and between the first gate lines 102. As illustrated in FIG. 1, the second gate lines 104 may be arranged perpendicular to the first gate lines 102. The second gate lines 104 may extend over the hardmask 110, and may include second gates 164 that extend down toward the quantum well stack 146 and contact the gate dielectric 114 between adjacent ones of the first gate lines 102, as illustrated in FIG. 1D. In some embodiments, the second gates 164 may fill the area between adjacent ones of the first gate lines 102/spacer material 118 structures; in other embodiments, an insulating material (not shown) may be present between the first gate lines 102/spacer material 118 structures and the proximate second gates 164. In some embodiments, spacer material 118 may be disposed on side faces of the second gate lines 104; in other embodiments, no spacer material 118 may be disposed on side faces of the second gate lines 104. In some embodiments, a hardmask 115 may be disposed above the second gate lines 104. Multiple ones of the second gates 164 of a second gate line 104 are electrically continuous (due to the shared conductive material of the second gate line 104 over the hardmask 110). Different ones of the second gate lines 104 may be electrically controlled in any desired combination (e.g., each second gate line 104 may be separately electrically controlled, or some or all the second gate lines 104 may be shorted together in one or more groups, as desired). Together, the first gate lines 102 and the second gate lines 104 may form a grid, as depicted in FIG. 1.

Multiple parallel third gate lines 106 may be disposed over and between the first gate lines 102 and the second gate lines 104. As illustrated in FIG. 1, the third gate lines 106 may be arranged diagonal to the first gate lines 102, and diagonal to the second gate lines 104. In particular, the third gate lines 106 may be arranged diagonally over the openings in the grid formed by the first gate lines 102 and the second gate lines 104. The third gate lines 106 may include third gates 166 that extend down to the gate dielectric 114 in the openings in the grid formed by the first gate lines 102 and the second gate lines 104; thus, each third gate 166 may be bordered by two different first gate lines 102 and two different second gate lines 104. In some embodiments, the third gates 166 may be bordered by insulating material 128; in other embodiments, the third gates 166 may fill the openings in the grid (e.g., contacting the spacer material 118 disposed on side faces of the adjacent first gate lines 102 and the second gate lines 104, not shown). Additional insulating material 117 may be disposed on and/or around the third gate lines 106. Multiple ones of the third gates 166 of a third gate line 106 are electrically continuous (due to the shared conductive material of the third gate line 106 over the first gate lines 102 and the second gate lines 104). Different ones of the third gate lines 106 may be electrically controlled in any desired combination (e.g., each third gate line 106 may be separately electrically controlled, or some or all the third gate lines 106 may be shorted together in one or more groups, as desired).

Although FIGS. 1A-F illustrate a particular number of first gate lines 102, second gate lines 104, and third gate lines 106, this is simply for illustrative purposes, and any number of first gate lines 102, second gate lines 104, and third gate lines 106 may be included in a quantum dot device 100. Other examples of arrangements of first gate lines 102, second gate lines 104, and third gate lines 106 are possible. Electrical interconnects (e.g., vias and conductive lines) may contact the first gate lines 102, second gate lines 104, and third gate lines 106 in any desired manner.

Not illustrated in FIG. 1 are accumulation regions that may be electrically coupled to the quantum well layer of the quantum well stack 146 (e.g., laterally proximate to the quantum well layer). The accumulation regions may be spaced apart from the gate lines by a thin layer of an intervening dielectric material. The accumulation regions may be regions in which carriers accumulate (e.g., due to doping, or due to the presence of large electrodes that pull carriers into the quantum well layer), and may serve as reservoirs of carriers that can be selectively drawn into the areas of the quantum well layer under the third gates 166 (e.g., by controlling the voltages on the quantum dot gates, the first gates 162, and the second gates 164) to form carrier-based quantum dots (e.g., electron or hole quantum dots, including a single charge carrier, multiple charge carriers, or no charge carriers). In other embodiments, a quantum dot device 100 may not include lateral accumulation regions, but may instead include doped layers within the quantum well stack 146. These doped layers may provide the carriers to the quantum well layer. Any combination of accumulation regions (e.g., doped or non-doped) or doped layers in a quantum well stack 146 may be used in any of the embodiments of the quantum dot devices 100 disclosed herein.

Apparatus and Method for a Hybrid Classical Quantum Computer

After Richard Feynman asked in 1982 whether quantum physics could be simulated efficiently using a quantum computer, much effort researching for a quantum computer has been focused on its universality and its efficiency over classical computation. One such example is David Deutsch's quantum Turing machine in 1985 that can be programmed to perform any computational task that can be performed by any physical object.

In contrast to theories and algorithms, quantum physical machines are in still their infancy. Efforts to build quantum information processing systems have resulted in modest success to date. Small quantum computers, capable of performing a small set of quantum operations on a very few qubits, represent the state of the art in quantum computation. In addition, quantum states are fragile in the sense that quantum states only remain coherent for a limited duration. This gap between algorithms and physical machines has driven the effort to invent hybrid classical-quantum algorithms. Some recent quantum algorithm developments have focused on short-depth quantum circuits to carry out quantum computations formed as subroutines embedded in a larger classical optimization loop, such as the variational eigensolver (P. J. J. O'Malley, 2016). Quantum languages, tools, and flows have been developed, providing software layers/stacks to translate and optimize applications to the quantum physical layer to cope with the stringent resource constraints in quantum computing (Frederic T. Chong, 2017, 14 Sep.).

On the hardware side, classical computers have been used to perform error correction for quantum computations. The "quantum co-processor" model is the most favorable prevailing execution model where a classical CPU controls a quantum processing unit in a similar manner to how CPUs in modern computer systems interact with GPUs. As described in (X. Fu, 2016, May) and (X. Fu, 2018), the microarchitecture for experimental superconducting quantum co-processors included features such as an arbiter on the code fetch data path to steer classical instruction to host CPU and quantum instruction to quantum co-processor, an exchange register file to synchronize register files between host CPU and the quantum co-processor, and a quantum instruction cache.

The microarchitectures for these mechanisms, however, are not well defined and explicit support for hybrid classical-quantum programs is lacking. Consequently, it is unclear how a quantum co-processor would be implemented within a quantum computer, particularly one which is required to run a diverse set of quantum programs. A flexible and programmable model has yet to be developed for executing hybrid classical-quantum algorithms.

One embodiment of the invention adds a set of quantum instructions to an instruction set architecture (ISA) of a processor such as a CPU. By way of example, these instructions may be included in an extension to the ISA (e.g., such as the AVX-512 extensions for the x86 platform). In addition, in one embodiment, a quantum engine is added to the processor's execution unit and the new quantum instructions are fetched, decoded, scheduled, and executed on the functional units of the quantum engine. In one embodiment, the quantum engine interacts with the classical execution engines using a shared register file and/or system memory. Upon executing the quantum instructions (or quantum cops in certain embodiments described herein), the quantum execution engine generates control signals to manipulate the state of the qubits within the quantum processor. The quantum engine also executes instructions to take a measurement of specified sets of qubits and store the results. In these embodiments, a quantum/classical interface provides connectivity between the quantum engine of the classical processor and the quantum processor.

Figure 2:
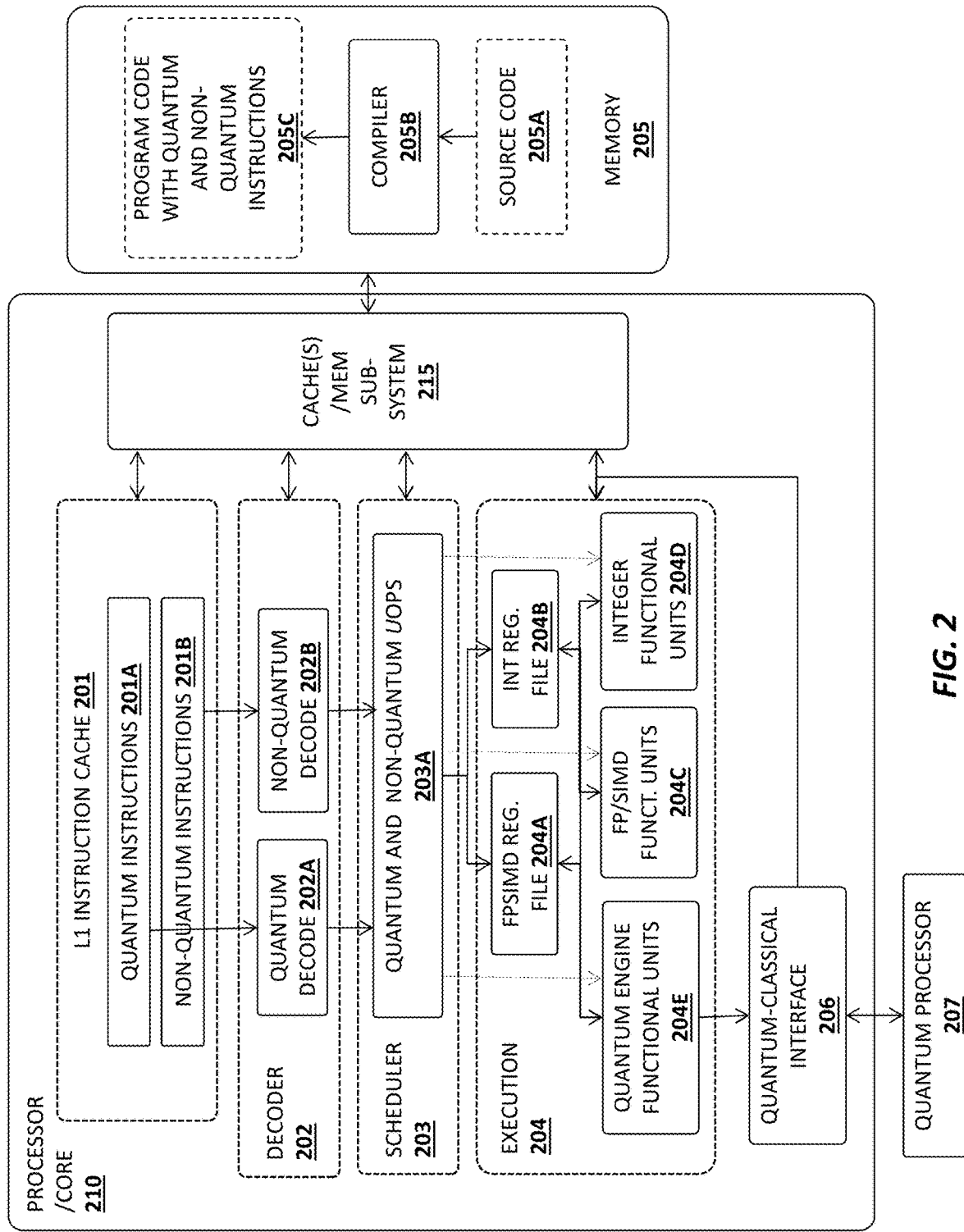
FIG. 2 illustrates one embodiment of a processor pipeline for processing quantum and non-quantum instructions.

FIG. 2 illustrates one embodiment of a processor or core 210 which fetches, decodes, and executes quantum instructions 201A and non-quantum instructions 201B, utilizing the same pipeline resources as the non-quantum instructions 201B. The processor/core 210 of this embodiment supports quantum extensions to an existing ISA of the processor/core 210 (e.g., extending the ISA to include the quantum instructions 201A). Program code 205C comprising the quantum and non-quantum instructions is generated by a compiler 205B from source code 205A written by a programmer (e.g., utilizing the extended ISA). Various source/program code examples are provided below.

Quantum and non-quantum instructions 201A-B are fetched from memory 205 at the front end of the instruction pipeline and stored in a Level 1 (L1) instruction cache 201. Instructions and data may also be stored within a Level 2 or Level 3 cache within a cache/memory subsystem 215, which manages memory requests and cache coherency.

A decoder 202 decodes the instructions 201A-B into micro-operations or uops 203A which are scheduled for execution by a scheduler 203 and executed by execution circuitry 204. In one embodiment, certain stages of the pipeline are enhanced to include hardware support for processing the quantum instructions 201B while other stages are unaltered. For example, quantum decode circuitry 202A may be added to the decoder 202 for decoding the quantum instructions 201A, just as non-quantum decode circuitry 202B decodes non-quantum instructions 201B. Although illustrated as separate components in FIG. 2 for the purpose of explanation, the quantum decode circuitry 202A and non-quantum decode circuitry 202B may comprise a common or overlapping set of circuitry and/or microcode. For example, in one embodiment, an existing decoder may be extended to include microcode support for quantum instructions (e.g., in microcode ROM) to generate new sets of quantum uops. The decoder 202 includes other decode circuitry such as a set of decode table structures (see, e.g., FIG. 3 and associated text), depending on the processor architecture.

In one embodiment, the decoder 202 generates a sequence of uops 203A in response to decoding the instructions 201A-B. In an implementation with quantum and non-quantum instructions, the uops may include a mixture of quantum uops and non-quantum uops, which are then scheduled for execution by an instruction scheduler 203.

The quantum and non-quantum uops 203A generated by the decoder 202 may initially be queued for execution within one or more uop queues of the scheduler 203, which dispatches the uops from the uop queue(s) in accordance with dependencies and/or execution resource availability. The embodiments of the invention may be implemented on various different types of processors with different types of schedulers. For example, in one embodiment, a set of execution "ports" couple the scheduler 203 to the execution circuitry 204, where each execution port is capable of issuing uops to a particular set of functional units 204C-E. In the example architecture shown in FIG. 2, for example, SIMD and floating point (FP) uops may be issued by the scheduler 203 over a FP/SIMD execution port coupled to a set of FP/SIMD functional units 204C and integer uops may be issued over an integer port coupled to a set of integer functional units 204D. While only two types of non-quantum functional units are shown for simplicity, the processor/core 210 may include various other/additional non-quantum functional units (e.g., such as load/store address generation units, branch units, additional SIMD and integer units, etc).

In the particular embodiment shown in FIG. 2, the quantum engine functional units 204E share the same set of register files 204A-B used by the legacy processor functional units 204C-D. In this particular example, the register files 204A-B include a FP/SIMD register file 204A which stores floating point and SIMD operands used by the FP/SIMD functional units 204C and an integer register file 204B which stores integer operands for the integer functional units 204D. In one implementation, the FP/SIMD register file 204A comprises 512 bit vector registers and the integer register file 204B comprises 64-bit scalar registers. Of course, different processor architectures will use different types of registers shared by the quantum engine functional units 204E. Various other types of registers may also be used such as a set of control/status registers and mask registers.

In an embodiment in which quantum uops are mixed with non-quantum uops, the quantum uops are issued over one or more quantum ports to a set of quantum engine functional units 204E, which execute the quantum uops to perform the underlying quantum operations. For example, the quantum engine functional units 204E, in response to the quantum uops, may generate control signals over a quantum-classical interface 206 to manipulate and take measurements of the qubits of a quantum processor 207.

The quantum-classical interface 206 includes digital-to-analog (D-A) circuitry to convert the digital quantum control signals generated by the quantum engine functional units 204E to analog signals required to control the quantum processor 207 (e.g., such as the codeword triggered pulse generation (CTPG) units and Arbitrary Waveform Generator (AWG) described below) and also includes analog-to-digital (A-D) circuitry to convert the physical qubit measurements to digital result data.

In one embodiment, the quantum-classical interface 206 is integrated on the same semiconductor chip as the other components of the instruction processing pipeline (e.g., the execution circuitry 204, scheduler 203, decoder 202, etc). As discussed in detail below, different types of circuit/logic components may be used depending on the particular physical implementation of the quantum processor 207.

Figure 3:
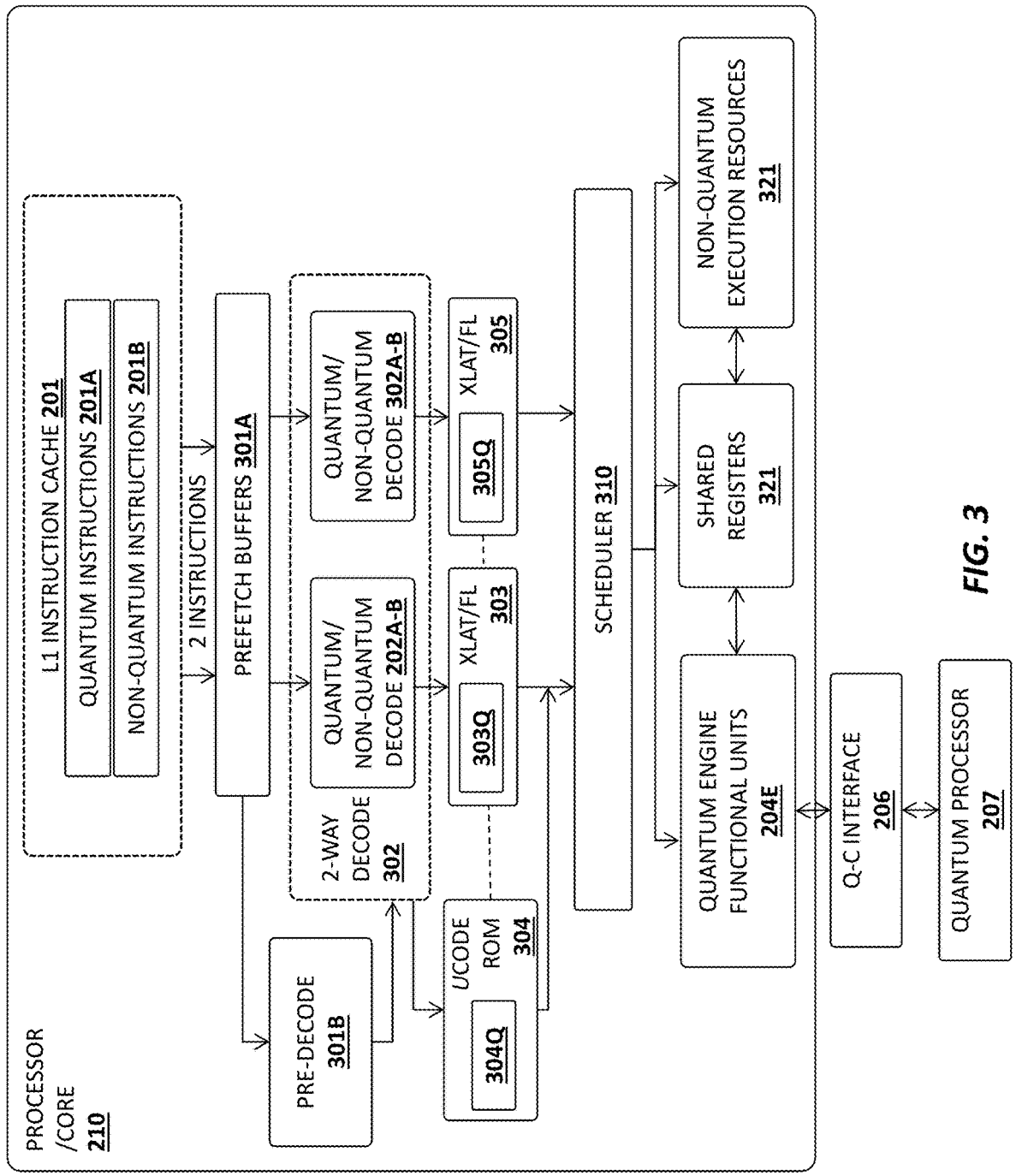
FIG. 3 illustrates an embodiment of front-end circuitry of a processor for processing quantum and non-quantum instructions.

FIG. 3 illustrates one embodiment in which quantum instruction processing support is added to a low power processing pipeline including a pre-decode buffer 301B, a 2-way decoder 302 with dual sets of quantum/non-quantum decoder circuitry 202A-B, 302A-B, dual lookup tables for instruction translation (XLAT), and a ucode ROM 304. In one embodiment, the XLAT components 303, 305 and ucode ROM 304 are extended to support the quantum instructions, as indicated by logic blocks 303Q-305Q. The pre-decode buffer 301B detects and marks macroinstruction boundaries prior to full decoding into uops by the 2-way decoder 302.

The operands for the quantum and non-quantum uops are stored in a set of shared registers 321 (as described above) and accessed by the quantum functional units 320 when executing the uops. The Q-C interface 320, in response to the quantum uops, controls the operation of the quantum processor 207.

Figure 4A:
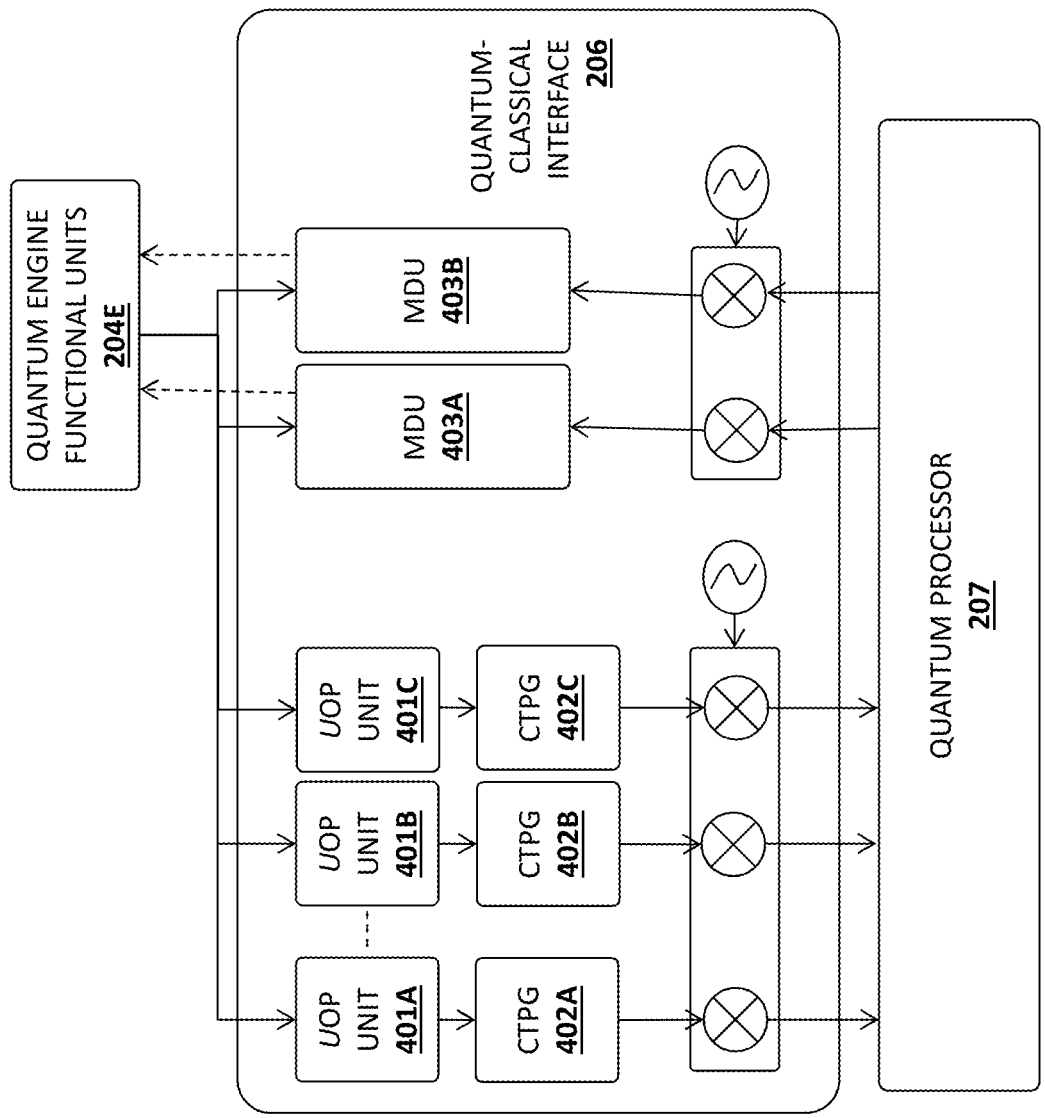
FIGS. 4A-B illustrate embodiments of a quantum-classical processor interface.
Figure 4B:
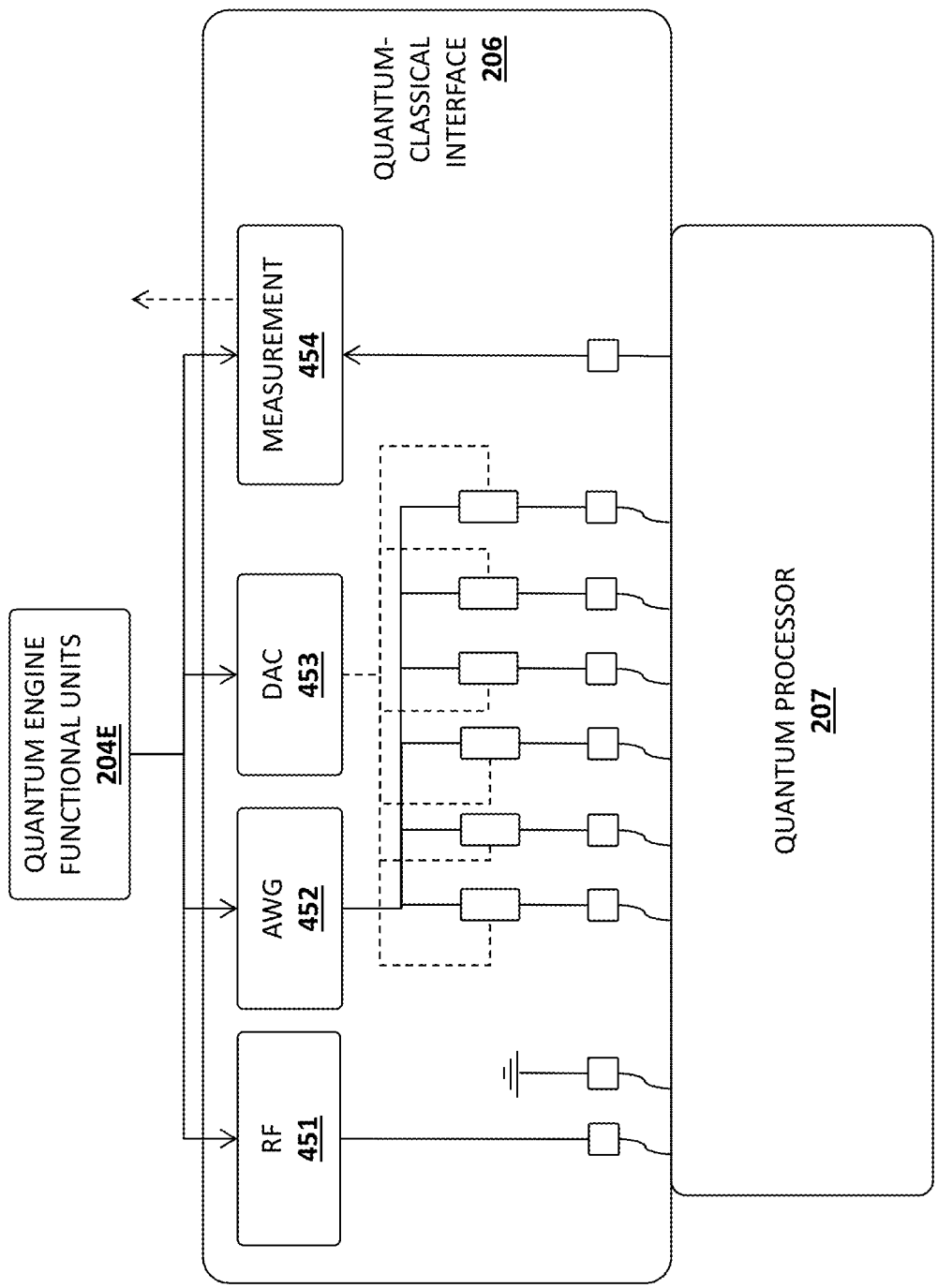

Different examples of a quantum-classical interface 206 are illustrated in FIGS. 4A-B. The Q-C interface 206 in FIG. 4A includes a plurality of uop units 401A-C which, responsive to the uops executed by the quantum engine functional units 204E, generate codewords to control operation of a plurality of codeword triggered pulse generation (CTPG) units 402A-C. In response, the CTPG units 402A-C generate sequences of pulses to control the qubits of the quantum processor 207. Once the quantum processor 207 has reached a specified execution state, quantum measurements are taken by one or more of the measurement discrimination units (MDUs) 403A-B.

The Q-C interface 206 shown in FIG. 4B includes a set of components to perform microwave complex signal generation including an RF microwave unit 451, a multi-channel Arbitrary Waveform Generators (AWG) 452, one or more digital to analog converters (DACs) 453 and one or more measurement units 454. In one embodiment, the input to each of these components comprises a set of codewords generated by the quantum engine functional units 204E and the output is an analog waveform which manipulates the state of the qubits of the quantum processor 207. The measurement units 454 measure a current state associated with one or more qubits at a designated point in execution.

Figure 5A:
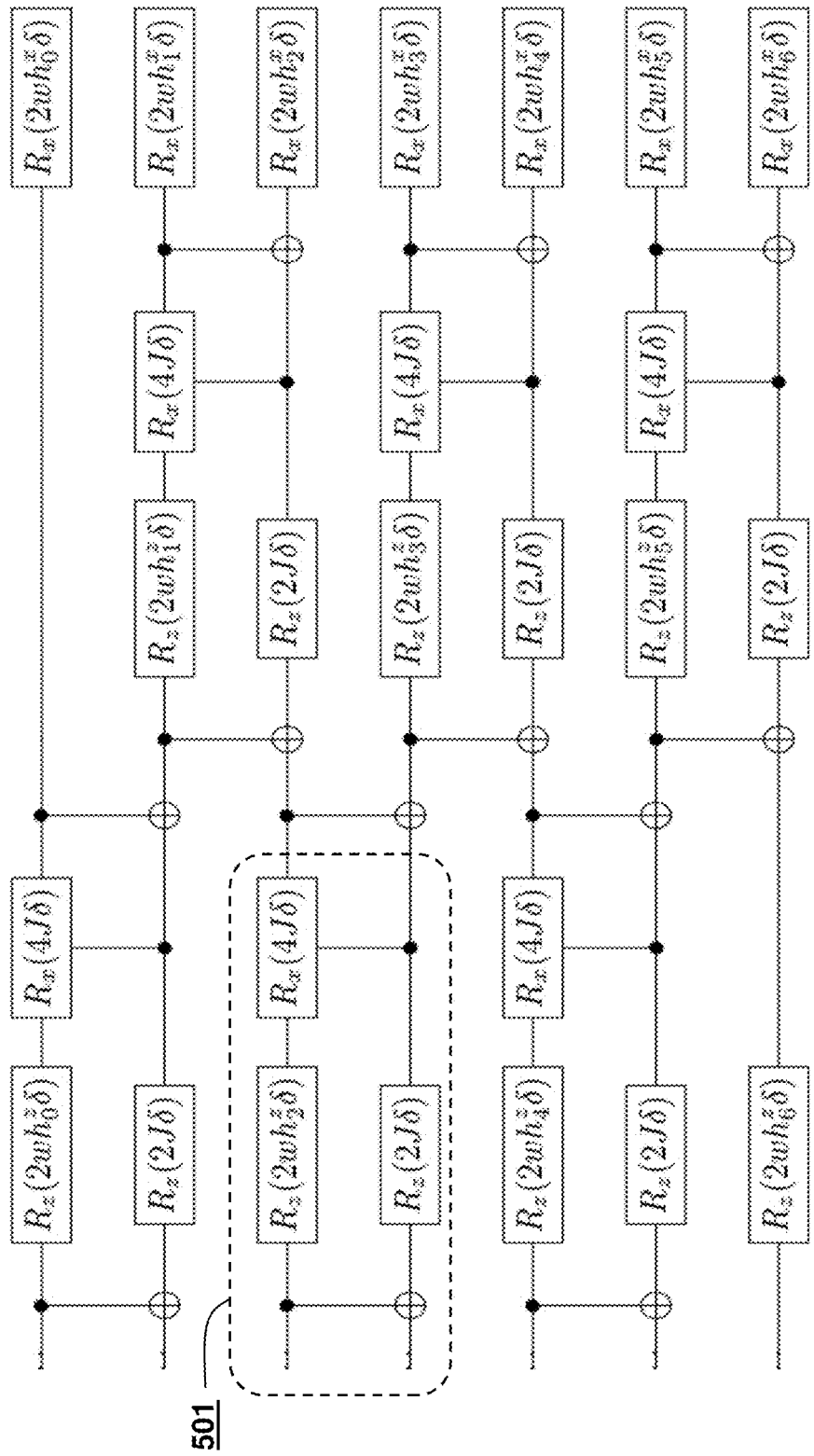

To further guide the analysis and discussion, a concrete example is illustrated in FIG. 5A, which shows a quantum circuit for a many-body disordered Hamiltonian to be time-evolved. Note that the angle through which $R_x$ and $R_y$ rotate are derived from several parameters. Particularly, $h_k^z$ and $h_k^x$ with $k \in \{0, 1, \ldots, 5, 6\}$ are randomly generated and are used to emulate large many-body systems that require many more number of qubits than what the underlying quantum chip supports.

One example of a quantum program that uses this circuit for a portion of its computation is illustrated in FIG. 5B which includes a mixture of quantum instructions and non-quantum instructions (as indicated by the comments to the right of the source code). In this example, NR is the number of disorder realizations (i.e. multiple small random realizations to emulate a large many-body system), NQ is the number of Qubits, NP is the number of iterations in order to achieve the required precision on Probability (Pr), NT is the number of Trotter steps, and a[i] accumulates Qubit measurement. The probability of qubits being in state $|0>$ or $|1>$ is obtained by repeating measurements (NP) and averaging.

This program structure shows how classical operations and quantum operations may be tightly intertwined and executed on the classical-quantum processing architectures described herein. The most efficient way to execute this program is to process all instructions in a pipeline such as those described above, with the quantum engine functional units 204E for controlling qubits configured as execution engine peer to other classical execution engines 204A-B (such as integer, floating point, etc.).

Figure 6A:
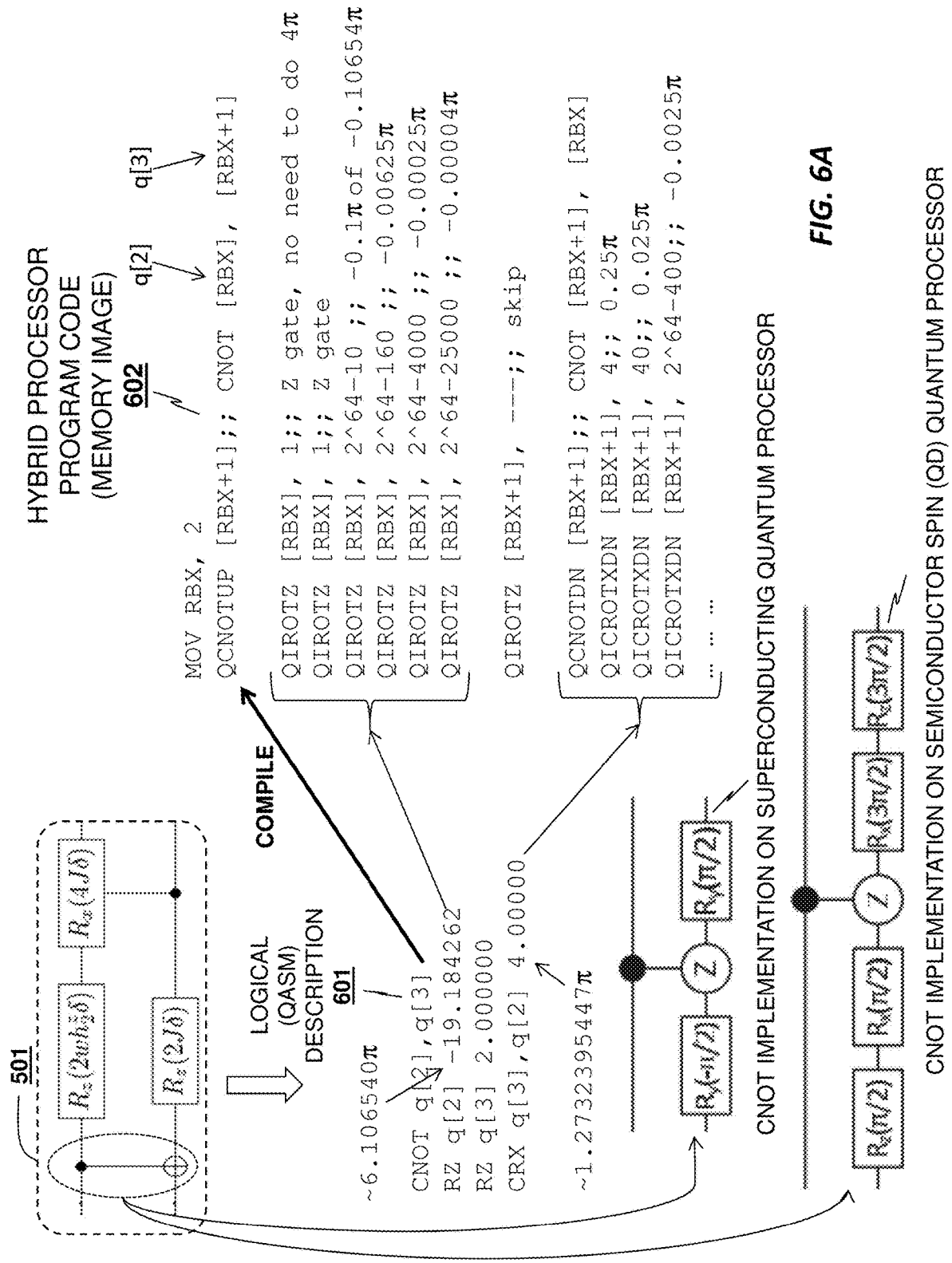
FIGS. 6A-B illustrate an example in which quantum instructions are generated by a compiler, decoded into uops, and executed within a quantum execution engine.
Figure 6B:
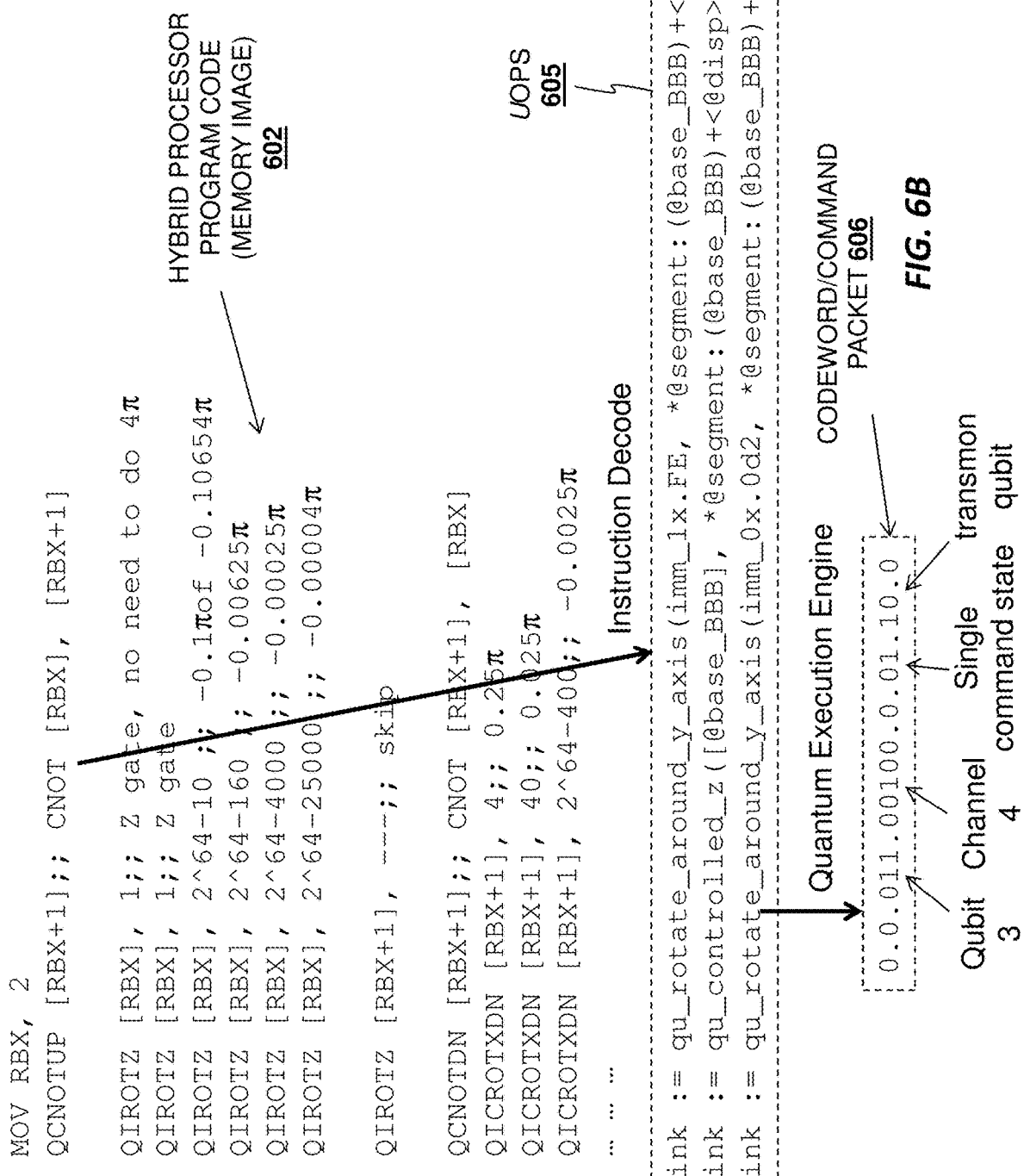

FIGS. 6A-B provide an example to demonstrate the operation of one embodiment of the invention. FIG. 6A illustrates a portion of quantum assembly language (QASM) code 601 to implement the highlighted portion 501 of the quantum circuit in FIG. 5A. The QASM code 601 is compiled into hybrid processor program code 602 in memory 205. In this example, the registers RBX and RBX+1 from the shared register file 321 or 204B are used to hold qubit indices to address logical qubits #2 and #3, respectively, in this particular example. The mapping of the relevant portions of the QASM code 601 to the hybrid processor program code 602 is indicated by arrows.

FIG. 6B illustrates how a quantum macroinstruction QCNOTUP (to implement a CNOT gate) is decoded into a series of uops 605 by the decoder 202. The uops 605 are executed by the quantum engine functional units 204E to generate codewords with a specified codeword or command packet format 606. In one particular format, a first data field indicates the qubit on which the operation is to be performed (qubit 3 in the example), a second data field indicates the channel over which the operation is to be transmitted (channel 4), a third field to indicate the command state (e.g., single command state), and a fourth data field to indicate the type of qubit (a transmon qubit). Of course, the underlying principles of the invention are not limited to any particular encoding format.

A method in accordance with one embodiment of the invention is illustrated in FIG. 7. The method may be implemented within the context of the processor architectures described above but is not limited to any particular processor or system architecture.

At 701 source code containing quantum instructions is compiled to generate runtime program code with quantum and non-quantum instructions. At 702 the quantum/non-quantum instructions are fetched from memory and stored in a local cache (e.g., the L1 instruction cache) or instruction buffer. As mentioned, quantum instructions may be freely mixed with non-quantum instructions within the pipeline.

At 703 the quantum and non-quantum instructions are decoded into sets of quantum and non-quantum uops, respectively, and stored in a queue prior to execution. At 704 the quantum/non-quantum uops are scheduled for execution based on uop and/or resource dependencies. For example, if a first uop is dependent on the results of a second uop then the first uop may be scheduled for execution only when the data produced by the second uop is available in one of the registers. Similarly, if a particular functional unit is busy, then the scheduler may wait for an indication that the functional unit is available before scheduling a uop which requires that functional unit. Various other/additional scheduling techniques may be implemented (e.g., scheduling based on priority, register load, etc).

At 705 the quantum uops and non-quantum uops are executed on their respective functional units within the execution circuitry. As mentioned, the shared register set may be used to store the source and destination operands required by these uops.

At 706, the results generated by the execution of the quantum uops may be used as input to an interface unit to control the quantum state of the qubits in a quantum processor. In one embodiment, a series of codewords or command packets may be generated which identify a quantum channel, one or more qubits within a quantum processor, a qubit type and/or a command state. The specific physical operations performed in response to the codeword or command packet is based on the underlying type of quantum processor used.

The embodiments described herein integrates quantum instructions within an existing processor pipeline. Because of the tight integration, these embodiments significantly reduces the various overheads/bottlenecks associated with current co-processor designs. These overheads/bottlenecks include, for example, the communication between the classical computation layers/modules and the quantum computation layers/modules in the software stack and between the classical CPU and the quantum chip via the message queue. Given the relatively small size of quantum routines, the current GPU-like co-processor implementations are inefficient.

Due to increased classical processing capabilities, hybrid co-processor models reduce some of the overhead. In one particular implementation which supports the hybrid co-processor model, many new micro-architecture mechanisms were introduced. However, these micro-architectural mechanisms were ambiguously defined as was the boundary between the classical CPU and quantum co-processor.

In contrast, in the hybrid architecture described herein, the classical computation pipeline is equipped to fully support a defined set of quantum instructions which may be freely mixed with non-quantum instructions both at the front end of the pipeline (i.e., at the macroinstruction level) and within the back-end of the pipeline (e.g., where quantum cops are mixed with non-quantum uops) and executed on functional units within the execution circuitry of the processor.

Scalable Qubit Addressing Mode for Quantum Execution Engine and/or Co-Processor

In quantum computing, a qubit is a unit of quantum information which is the quantum analogue of a classical binary bit. The computation is achieved by applying quantum gates, representing quantum logical operations, directly to qubits. Mathematically, this computing process is described as qubits undergo unitary transformations. Upon completion of computation, qubits are measured to gain information about the qubit states.

Therefore, to describe a quantum operation, it is necessary to identify the qubit or set of qubits to which the operation is applied. In a quantum program, each quantum instruction needs to encode both an operation to be performed and one or more qubits on which to perform the operation. In existing quantum instruction set architectures (e.g., QASM, Open QASM, QIS, etc) register operands are normally encoded in the opcode of an instruction. This scheme works for classical computing because the number of registers are very limited (e.g., 16, 32, 64, etc). However, this scheme is not scalable for quantum computing as quantum instructions will ultimately need to address a very large numbers of qubits. Consequently, encoding qubit addresses in the opcode field of quantum instructions would explode the instruction width.

As described above, in one embodiment, quantum instructions and non-quantum instructions are processed together within a shared processor pipeline. As such, the quantum instructions may rely on the same addressing modes as those available to the non-quantum instructions. The qubits in this embodiment are therefore addressed in a similar manner as non-quantum instructions which access system memory, providing a sufficiently large address space to accommodate a large number of qubits.

Figure 8:
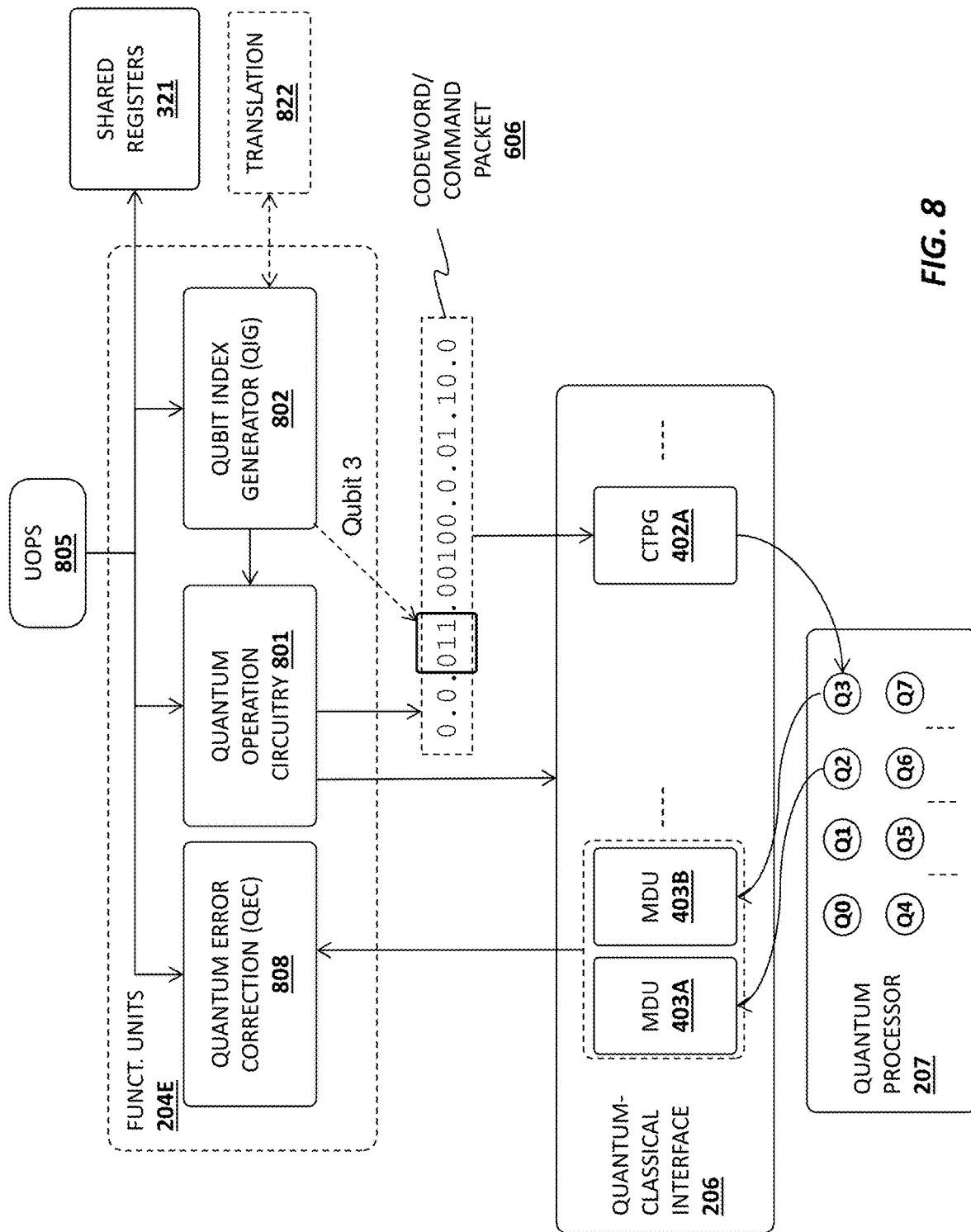
FIG. 8 illustrates one embodiment of a qubit index generator for addressing qubits within a quantum processor.

As illustrated in FIG. 8, in this embodiment, the quantum engine functional units 204E include a qubit index generation unit (QIG) 802 which determines a qubit index value or qubit ID in response to one or more uops 805. One or more quantum operation units 801 process the operations specified by the uops. The qubit index value (e.g., 011 for qubit 3 in the example) is then incorporated within the codeword/command packet 606, potentially along with one or more commands generated by the quantum operation unit 801 in response to processing the uops 805.

The QIG 802 may operate in accordance with different addressing modes supported by the processor. In one embodiment, the instruction identifies one of the shared registers 321 which contains the qubit index value (sometimes also referred to as a qubit ID). It may then use the qubit index value to identify the qubit within the codeword/command packet 606 and/or perform an operation using the qubit index value to generate one or more additional qubit index values. For example, it may add the qubit ID value to an integer specified by the uop to generate a second qubit ID.

The following examples demonstrate one way in which the QIG 802 generates qubit IDs in response to uops using an x86 assembly syntax. These operations may be performed within an x86 pipeline extended to support quantum instructions. However, the same general principles may be implemented on any processor architecture.

The single qubit instruction "QIROTX [RDI], 1" applies an X gate to the qubit number stored in RDI. Thus, if RDI contains 5, the X gate is applied to qubit number 5. In this example, the QIG 802 determines the qubit ID simply by reading the value stored in RDI (which is one of the shared registers 321 in this example). In this embodiment, the RDI value was stored previously by another uop. As another example, if the architecture register RBX contains a value of 2, then the two qubit instruction "QCNOTUP [RBX+3]," applies a CNOT operation with qubit 2 (q[2]) being the control qubit and qubit 5 (q[5]) being the target qubit. The QIG interprets the [RBX+3] notation as: the ID of the control qubit is stored in RBX and the ID of the control qubit+3 is the target qubit ID. Thus, the addressing scheme is extended so that two different qubits can be addressed with a single instruction, (i.e., CNOT). In contrast, in classical computing, only one memory location is addressed per instruction.

FIG. 8 also illustrates a codeword triggered pulse generator (CTPG) 402A which includes control logic and an analog-to-digital converter for interpreting the codeword/command packet 606 to identify one or more qubits (Q3 in the example) and generate a sequence of pulses to implement the specified quantum operations. When all of the quantum operations have been performed, as specified by the program code 205C, the quantum operation circuitry 801 and QIG 802 generates a codeword/command packet 606, causing one or more MDUs 403A-B to take a measurement of one or more qubits (as specified by the QIG 802 which generates the qubits indices). As mentioned, the MDUs include analog-to-digital circuitry to convert the analog measurements to digital values, which are then processed by a quantum error correction unit 808 to detect and potentially correct errors. If valid result data has been received it may be stored within one or more of the shared registers 321 and/or accumulated with prior measurement data. In addition to error correction, the measurement can also be used for program flow control based on measurement feedback.

The quantum error correction unit 808 may implement various techniques for detecting and correcting quantum errors. For example, in one embodiment, an error decoder (within the QEC unit 808) decodes a multi-qubit measurement from the quantum processor 207 to determine whether an error has occurred and, if so, implements corrective measures (is possible). The error measurements may be taken from multiple qubits in a manner which does not disturb the quantum information in the encoded state of the qubits (e.g., using ancilla qubits). In response, the QEC unit 808 generates error syndrome data from which it may identify the errors that have occurred and implement corrective operations. In one embodiment, the error syndrome data comprises a stabilizer code such as a surface code. In some cases, the response may simply be to reinitialize the qbits and start over. In other cases, however, modifications to the quantum algorithm implemented in the quantum program code 205C can be made to stabilize the region of the quantum processor responsible for the error (e.g., where compiler 205B includes a just-in-time (JIT) compiler). In either case, the CTPGs 402A perform the underlying physical operations under the control of the codewords/command packets 606 generated by the QEFU 204E. For example, the CTPG 402A may generate electromagnetic pulses to adjust the phase of one or more qbits in accordance with the detected phase error, or to reset the phase/spin of all qbits if re-initialization is required.

Addressing qubits in a manner which is similar to how classical CPU's address memory provides the scalability characteristics/attributes required for future quantum processor implementations. In particular, the above-described embodiments provide qubit indexing which is seamlessly integrated within an existing processor ISA and scales to a large number of qubit systems. These embodiments also remove pressure from the quantum instruction opcode space by way of a quantum extension to x86 or other architectures to address the qubit space and integrate quantum operations to existing processor pipelines.

Figure 9:
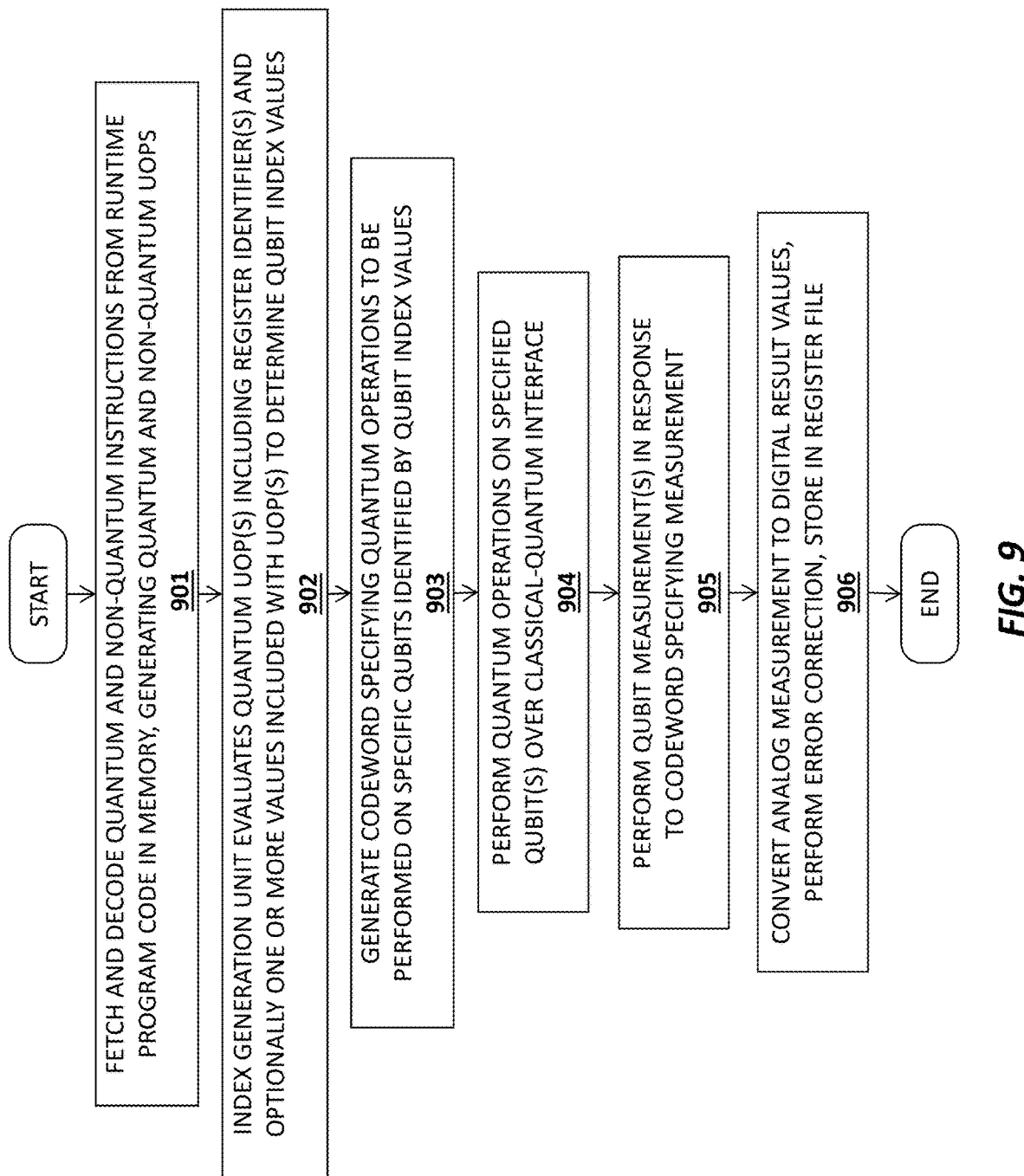
FIG. 9 illustrates a method for determining qubit index values for identifying qubits.

A method in accordance with one embodiment of the invention is illustrated in FIG. 9. The method may be implemented on the architectures described above but is not limited to any particular processor or system architecture.

At 901 quantum and non-quantum instructions from runtime program code are fetched and decoded, generating quantum and non-quantum uops. At 902 an index generation unit evaluates quantum uops including register identifiers and optionally one or more values included with the uops to determine qubit index values. As described above, the indices may be generated using a variety of techniques including reading qubit index values from registers identified by the uops and generating additional qubit index values using integer values included with the uops.

At 902, the quantum execution circuitry generates a codeword specifying the quantum operations to be performed on the qubits identified by the calculated qubit index values. At 905, qubit measurements are performed in response to another codeword generated based on additional uops. At 906, the analog measurement made on one or more of the qubits are converted to digital values. Error correction and/or flow control may then be performed based on the resulted digital result values stored in a register file of the processor.

Apparatus and Method for Injecting Corrective Quantum Operations in a Processor Pipeline During two qubit operations in a quantum computing system an exchange or interaction mechanism is typically employed which adds a drift term to the phase of the interacting qubits. This drift term tends to degrade qubit coherence exponentially over sequences of two qubit operations resulting in a lower T2 (dephasing) time. This limits the amount of time available for quantum operations and reduces the robustness and usefulness of the quantum computing system.

The resilience of a quantum computing system can be improved using corrective pulse sequences transmitted along with the quantum operations. These corrective pulse sequences are generated statically by a compiler for later replay on quantum experimental hardware. Hand generated pulse sequences that compensate for decoherence in the quantum circuit may also be programmed directly into the system.

However, long trains of pulse sequences require exponential memory resources to store the waveforms prior to replay at the hardware level. In addition, bandwidth to feed the pulse train into the system hardware limits scalability to low circuit depth algorithms because of the overhead of sending corrective pulse sequences between each quantum gate operation. Hand-generated pulse sequences are tedious and not scalable to a large number of qubits or long circuit depth algorithms.

To build a more resilient quantum microcode for a general purpose quantum computing system, the issues of decoherence and incorrectly shaped control pulses need to be addressed. Decoherence refers to the fact that qubits decohere through loss of phase information encoded in them just by sitting idle. Imperfectly shaped control pulses can cause qubits to lose phase alignment, resulting in the qubits moving off resonance. The next quantum operation on that qubit will be only partially effective which results in a certain amount of error in the computation.

To address the above problems, one embodiment of the invention uses a lookup table or other indexed data structure (simply referred to below as a "lookup table") to store sequences of corrective operations associated with different quantum operations. When a quantum instruction is received in the decoder unit, the lookup table is accessed to determine whether there is a corrective sequence available for this quantum operation. The unique opcode of the macroinstruction or combinations of uops resulting from the macroinstruction may be used as an index to the lookup table, to identify any corrective actions. If a corrective pulse sequence is found, then a corresponding set of corrective uops specifying the pulse sequence are injected in the instruction stream in place of (and/or in combination with) the uops for the qubit operations.

The corrective uops are forwarded to the quantum execution unit, which executes the corrective uops to generate the corrective set of pulses. In one embodiment, the corrective uops are uniquely tailored to each specific qubit as well as different combinations of qubits (e.g., for two qubit operations between qubits). In one embodiment, the corrective set of uops to generate the corrective pulses may be compiled over time based on observations made with respect to specific qubits, sets of qubits, and/or specific operations. If a particular qubit or set of qubits is showing problems with decoherence, for example, then one or more uops may be automatically added to the lookup table to correct this issue.

The decoherence problem may be identified by a quantum error correction unit which, in one embodiment, includes a machine-learning engine to identify the decoherence problem based on an analysis of quantum calculations over a period of time. It may then identify a specific set of uops and operand values needed to correct the problem. Thus, one embodiment of the invention includes a quantum processor, an instruction decoder, a micro-op sequencer, and a quantum micro-code execution engine along with a look-up table that contains some preconfigured pulse sequences for each type of quantum gate which is supported by the instruction set.

Figure 10:
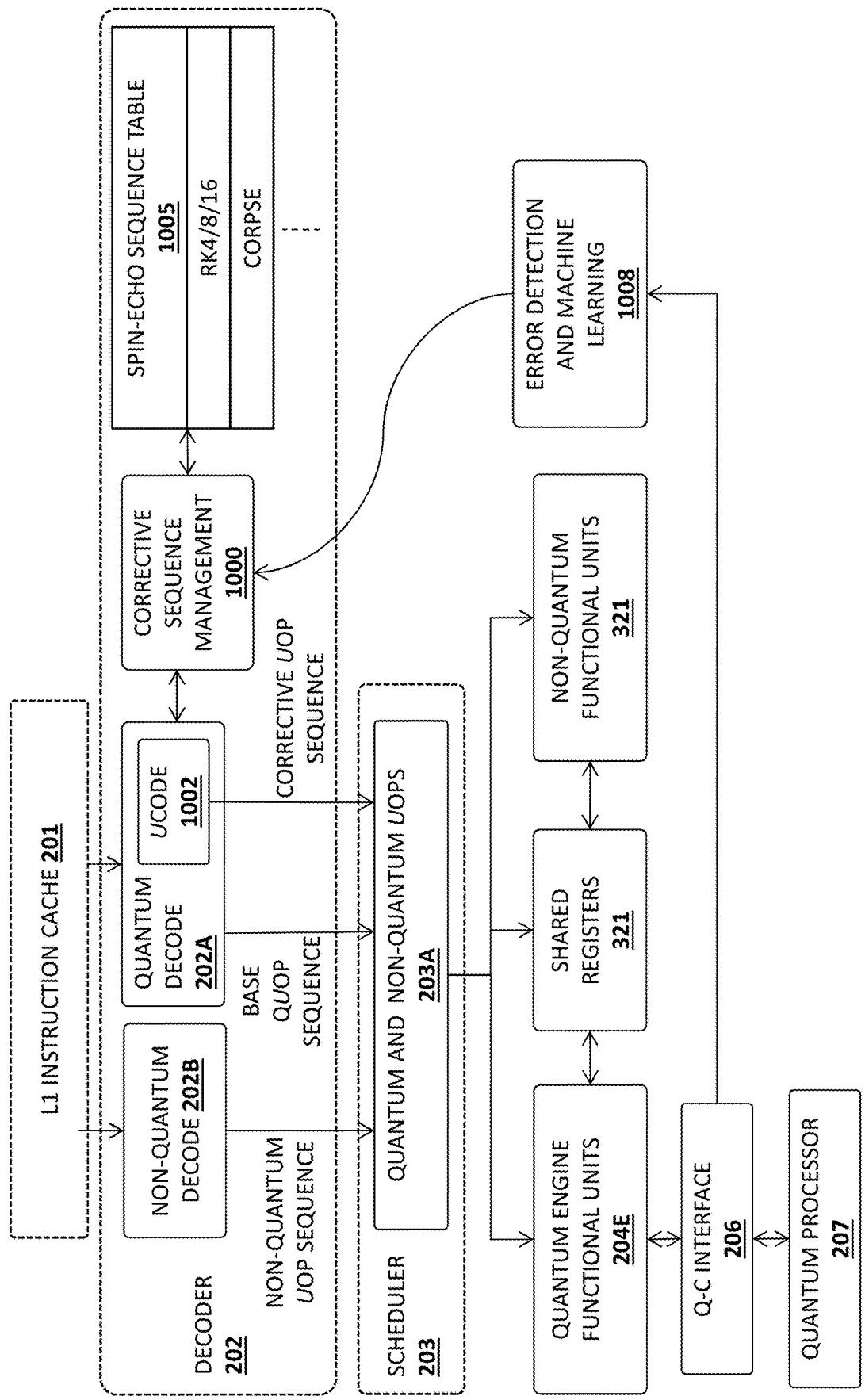
FIG. 10 illustrates one implementation which uses corrective uop sequences.

FIG. 10 illustrates one embodiment including a quantum decoder 202A with corrective sequence management logic/circuitry 1000 to manage and perform lookups in a spin-echo sequence table 1005 to store a specific set of uops and operand values for each instruction needed to correct qubit errors. When a quantum instruction is read into the quantum instruction decoder 202A, the corrective sequence management logic/circuitry 1000 performs a lookup to determine if there is a corrective pulse sequence for the qubit (or set of qubits) and/or the quantum operation identified by the instruction. If one is found, then the regular set of uops for the instruction are replaced by a corrective uop sequence. In the particular embodiment in FIG. 10, a corrective-pulse-generation enabled microcode sequencer (hereinafter "corrective microcode sequencer") 1002 generates the corrective uop sequence, which may replace the original uop sequence or may supplement it (e.g., integrating the corrective uops within the original uop sequence). In an embodiment in which the original uop sequence is replaced, the spin-echo sequence table 1005 contains the uops to realize both the echo sequence (for correction) as well as the uops to perform the operation specified by the quantum instruction.

Regardless of how it is generated, the corrective uop sequence is scheduled for execution on the quantum engine functional units 204E which executes the new composite pulse sequence via the Q-C interface 206.

In one embodiment, the spin-echo sequence table 1005 is statically generated based on calibration tests run on the quantum processor 207. After the initial static update, the corrective sequence management circuitry/logic 1000 dynamically updates the spin-echo sequence table 1005 over time, as new errors are associated with the various qubits of the quantum processor 207. In one embodiment, the error detection and machine-learning logic/circuit 1008 may continuously analyze results generated by the quantum processor 207 during runtime and specify corrective actions to be taken by the corrective sequence management circuitry/logic 1000, which then updates the spin-echo sequence table 1005 with new corrective uop sequences and/or new operand values needed to make the corrections. Decoherence, for example, may be identified by repeated errors related to the state of a particular qubit or a particular combination of qubits.

In one embodiment, when the error detection and machine-learning logic/circuit 1008 detects an error syndrome which it has not seen before, it will attempt to identify any correlations between the new error syndrome and previously learned models. Based on these correlations, it may generate a new entry in the spin-echo sequence table 1005 with a set of correction uops. If the corrective recommendation did not resolve the error, the error detection and machine-learning logic/circuit 1008 will make another attempt until desired results are achieved, at which point it will keep the corrective uops entered in the spin-echo sequence table 1005.

Thus, in one embodiment, the machine-learning logic/circuit 1008 performs unsupervised learning of new errors as they occur. Unsupervised learning is particularly beneficial for working with a quantum processor 207 because the physical responses of the individual qbits may change over time and may also vary from one quantum processor to another. In one implementation, the error detection and machine-learning logic/circuit 1008 is initially equipped with a set of basic models which are commonly used to detect and correct certain types of errors. Starting with this base set of models, the error detection and machine-learning logic/circuit 1008 continually trains itself in response to detecting new errors and update the models and the spin-echo sequence table 1005 accordingly. As a result, the error detection and machine-learning logic/circuit 1008 will become familiar with the particular characteristics of the quantum processor 207 with which it is associated and will learn to correct different types of errors, some of which may be unique to this quantum processor 207.

Figure 11:
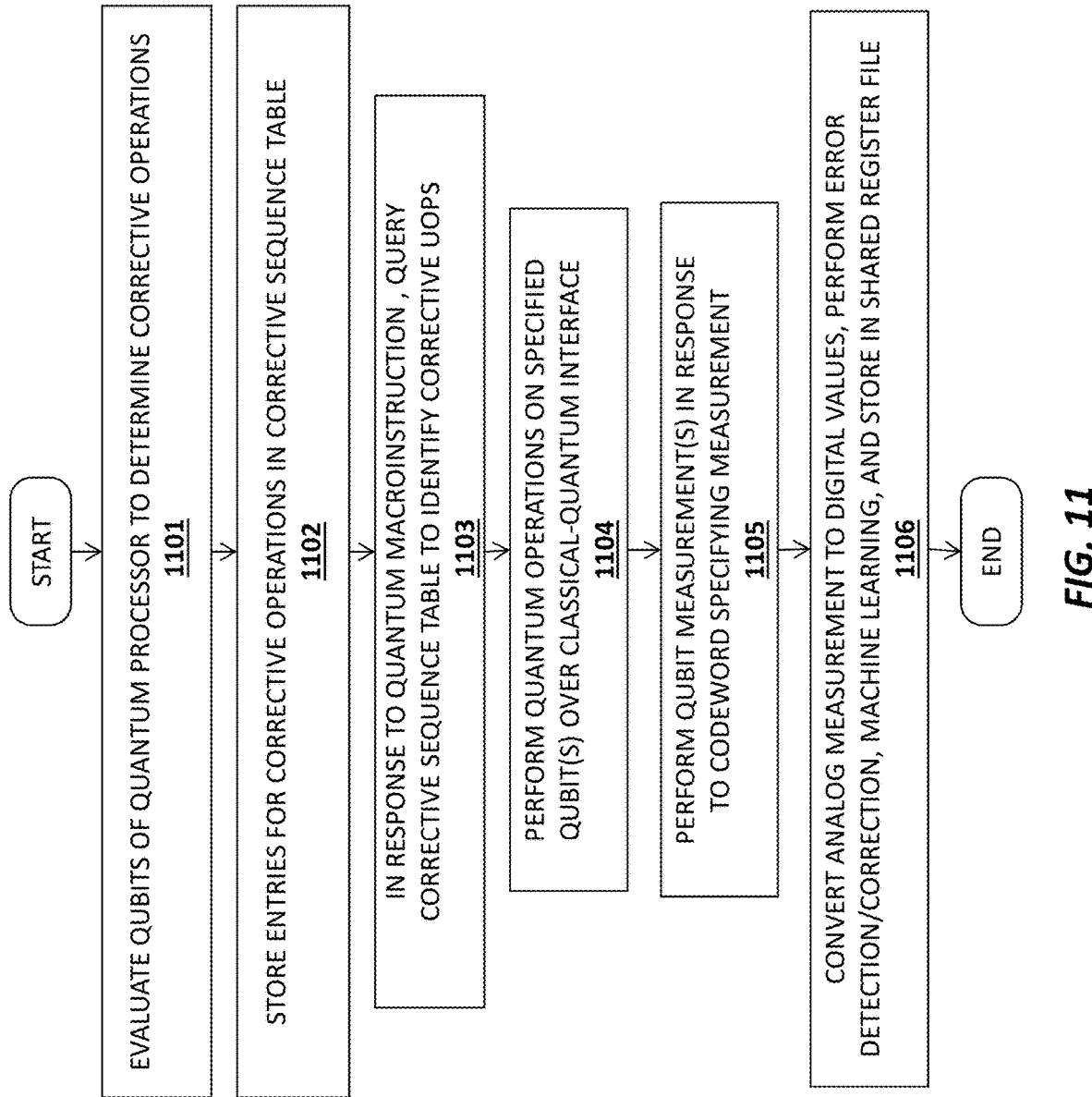
FIG. 11 illustrates a method for managing and using corrective uop sequences.

A method in accordance with one embodiment of the invention is illustrated in FIG. 11. The method may be implemented on the architectures described above but is not limited to any particular processor or system architecture.

At 1101 a corrective training sequence may be executed where the qubits of a quantum processor are evaluated through a series of operations and measurements to determine corrective operations. Based on the results, a corrective sequence table (e.g., the spin-echo sequence table described above) is updated with entries specifying corrective operations to be performed on this particular quantum processor in response to certain instructions. As described above, the corrective entries may be stored in a microcode ROM and may identify sequences of uops to be executed in place of or in addition to the uncorrected quantum uops.

At 1103, in response to a quantum macroinstruction, the corrective sequence table is queried to identify corrective uops associated with the quantum operation and/or the specific qubits which will be used. At 1104, the specified quantum operations are performed on specified qubits over the classical-quantum interface. At 1105, qubit measurements are performed in response to a codeword specifying measurement(s). At 1106, the analog measurements are converted to digital values which are subject to error detection/correction and, in one embodiment, machine learning. The machine learning, for example, may identify changes to the corrective sequence table to improve the corrective uop sequences. The measurement values may also be stored in the shared register file where they may be further processed.

Apparatus and Method for Integrating a Quantum Control Stack on a Chip

Small-scale quantum information processors have been realized with various physical architectures. These processors include racks of classical control electronics in addition to the physical quantum chip placed inside a dilution refrigerator.

As quantum devices continue to mature, there is an emerging need to efficiently organize and orchestrate all elements of the control electronics stack so that the quantum physical chip can be manipulated (electrical controls, microwaves, flux) and measured with acceptable precision, allowing quantum experiments and programs to be conducted in a reliable and repeatable manner.

Research efforts have started moving towards a more compact form of the control electronics stack and classical computing components. However, in all current proposals, the quantum computer is built from physically separate and independently designed components including a classical CPU, a quantum co-processor, and control electronics. Because these components are designed with more flexible and generalized interfaces, the communication between these components includes significant energy overhead, which negatively impacts the control and operational efficiency of the quantum processor.

Figure 12:
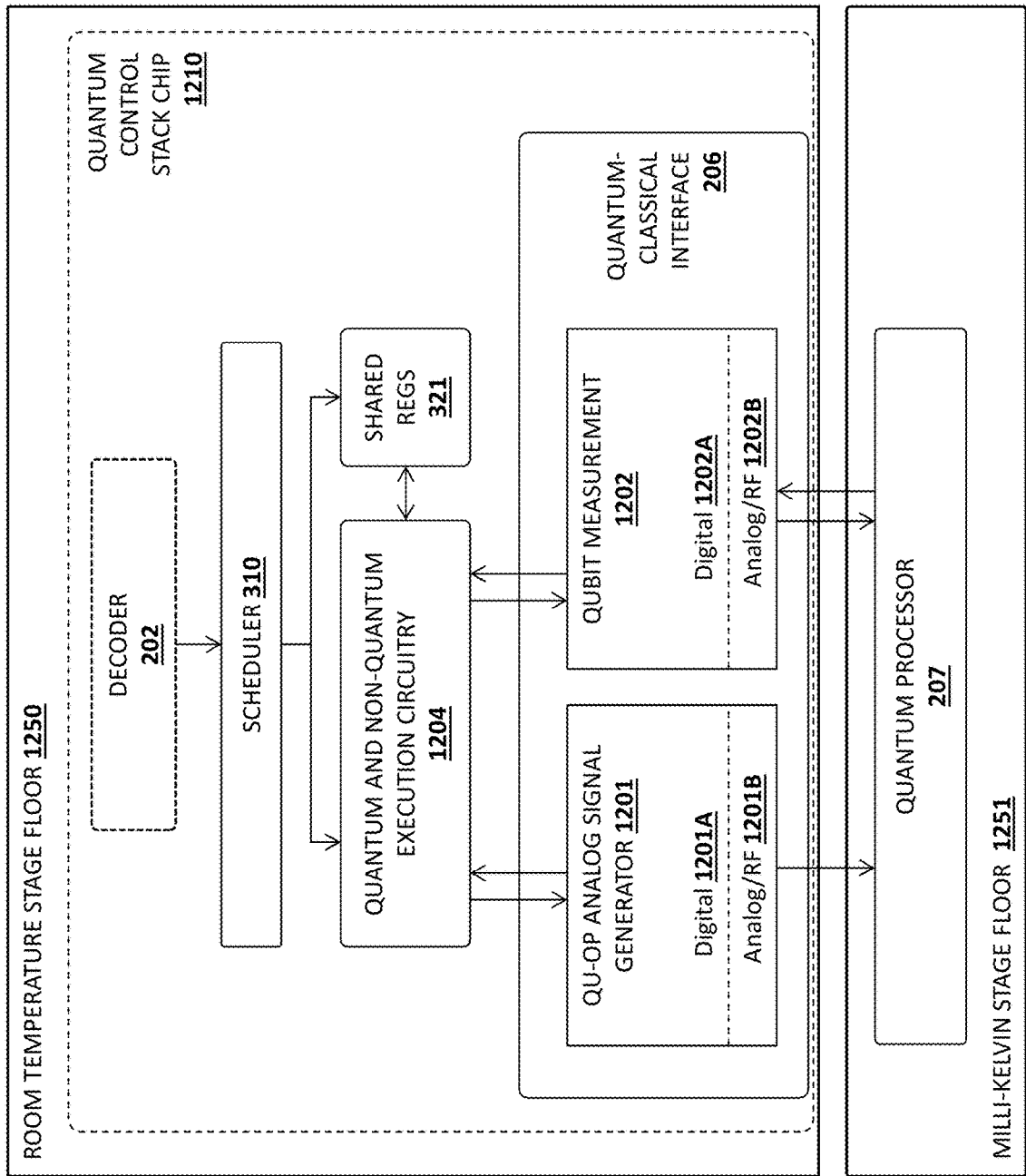
FIG. 12 illustrates one embodiment in which a quantum control stack is integrated on a single IC chip.

To solve these problems, one embodiment of the invention, illustrated in FIG. 12, integrates a classical CPU with support for quantum instructions, and quantum control electronics functions (DC, microwave, flux, measurement, etc) into one VLSI chip 1210. When integrated on the same chip, the communication between the different chip components may be highly optimized. In the particular embodiment shown in FIG. 12, the integrated quantum control stack chip 1210 includes an instruction decoder 202, scheduler 310, and execution circuitry 1204 for executing quantum and non-quantum instructions (as in the embodiments described above).

A quantum-classical interface 206 is also integrated on the quantum control stack chip 1210 which includes a quantum operation analog signal generator 1201 comprising an analog/RF component 1201B for generating analog signals to control the qubits of the quantum processor 207 based on digital waveforms received from the digital portion of the interface 1201A. In addition, qubit measurement circuitry 1202 includes an analog/RF measurement component 1202B for taking qubit measurements in response to signals received from a digital measurement component 1202A (e.g., responsive to execution of one or more measurement uops).

In one embodiment, the integrated quantum control stack chip 1210 has power/performance characteristics which allow it to be included within the room temperature stage floor 1250 of the quantum system and closely coupled to the quantum processor 207 which is maintained within the milli-kelvin stage floor 1251. In an alternate embodiment, a low temperature stage floor 1250 may be used (e.g., a 4 k stage floor).

Thus, this embodiment eliminates any inter-module interface and communication overhead at architecture level, directly coupling the quantum control stack chip 1210 to the quantum processor 207. The individually designed chip 1210 includes standard interface protocols. For example, current implementations have control and measurement ICs which use low bandwidth buses, such as a serial peripheral interface (SPI) bus, to communicate with the primary controller chip. When the primary control chip and control/management ICs are integrated, the interface between these components can be removed. Integration enables a highly efficient pipeline and data-path to be design to communicate control and data between functional units.

In addition, the inter-module communication may be optimized at the architecture level, to pass operations and receive data between the commander and responder. One example of an architecture-level protocol optimization is in the queue-based signal crossing between the non-deterministic timing domain of the digital quantum control stack chip 1210 and the deterministic timing domain of the quantum processor 207. Optimizations may also be employed between clock domains.

In general, the embodiment illustrated in FIG. 12 removes the IC system design and operation overhead that would naturally exist when coupling individually designed VLSI modules. This embodiment also improves the inter-module communication efficiency with metal layers in the VLSI process node and direct communication.

While one embodiment integrates the digital processor 1210 with the control electronics 206 that drive analog control signals to the quantum physical chip 207 to manipulate qubits, all such control electronics functionality need not be integrated at the same time. For example, the integration can be staged to pull in certain integrated circuits which have been thoroughly tested first, and then other components when they become mature. By way of example, and not limitation, the DC electronics and flux AWG integration within the quantum-classical interface 206 may be performed at a later time.

Method and Apparatus for Arbitrary Qubit Rotation on a Quantum Processor

In recent years, small-scale quantum information processors have been realized in different physical architectures. As quantum devices continue to mature, there is an emerging need to support arbitrary rotations of a single qubit. Moving qubit state from one arbitrary point on the Bloch Sphere to another arbitrary point on the Bloch Sphere can be treated as qubit rotation about an arbitrary axis which can be decomposed into rotation about y and z axes. If the rotation about the y axis is not available natively on a physical quantum device, it can be composed by rotation about the x and z axes. Hence, the support for arbitrary rotation of a single qubit is about the x and z axes.

The embodiments of the invention provide arbitrary rotation of a single qubit about a Bloch Sphere axis. While the embodiments described below focus on rotation about the X-axis, the underlying principles of the invention may be applied to rotation around the y and z axes. Moreover, while implementations on a quantum dot system or superconducting quantum system are described below, the underlying principles of the invention are not limited to these particular implementations.

On a quantum dot or superconducting quantum system, a precise arbitrary rotation requires a very specific RF waveform to be pulsed to the targeted qubit. There are two problems with designing a system to meet these requirements. First, "arbitrary" really means that the waveforms have to be infinitely precise which is not practical for qubit control electronics. In addition, to be sufficiently "precise," an enormous number of waveforms must be generated.

One embodiment of the invention solves these problems by approximating the rotation of arbitrary angles about the X-axis by a finite number of waveforms to achieve the required precision. In this embodiment, the control electronics only supports the basis set of angles to be rotated about the X-axis. An arbitrary rotation is translated into a sequence of rotations (gates) drawn from that basis.

The choice of the basis angle set and the decomposition design allow the quantum program to scale up the precision as the control electronics is scaled up to support more rotations with higher precision in the basis rotation set.

in one embodiment, two levels of decomposition are employed. First, the compiler decomposes a rotation unitary to sequence of $\pi/n$ where n is an integer $\in \{\pm 1, \ldots \pm n_{max}\}$ with $\pi/n_{max}$ approximating the hardware precision limit. In one embodiment, the processor can perform the second level to decompose $\pi/n$ into a sequence of $\pi/2^m$, where m is an integer $\in \{1, \ldots m_{max}\}$ with $\pi/2^{m\_max}$ being at the hardware precision limit. Normally $n_{max}=2^{m\_max}$. Note that the second level of decomposition could also be done by the compiler along with the first level of decomposition if the processor exposes rotation of $\pi/2^m$ in the instruction set architecture.

One embodiment is implemented within a hybrid classical-quantum x86-based architecture operates with one both of the macroinstructions:

QIROTX qoffs32, r32/imm32
QIROTX qoffs64, r64/imm64 for 32-bit and 64-bit versions, respectively. The first operand (qoffs32, qoffs64) specifies the destination qubit and the second operand (r32/imm32, r64/imm64) specifies the angle to be rotated. In one embodiment, the first operand is stored in a first source register and the second operand is stored in either a second source register or within an immediate of the instruction. The qubit indexing techniques described above may be employed to identify the qubit on which the rotation is to be performed (see, e.g., FIG. 8 and associated text).

Figure 13A:
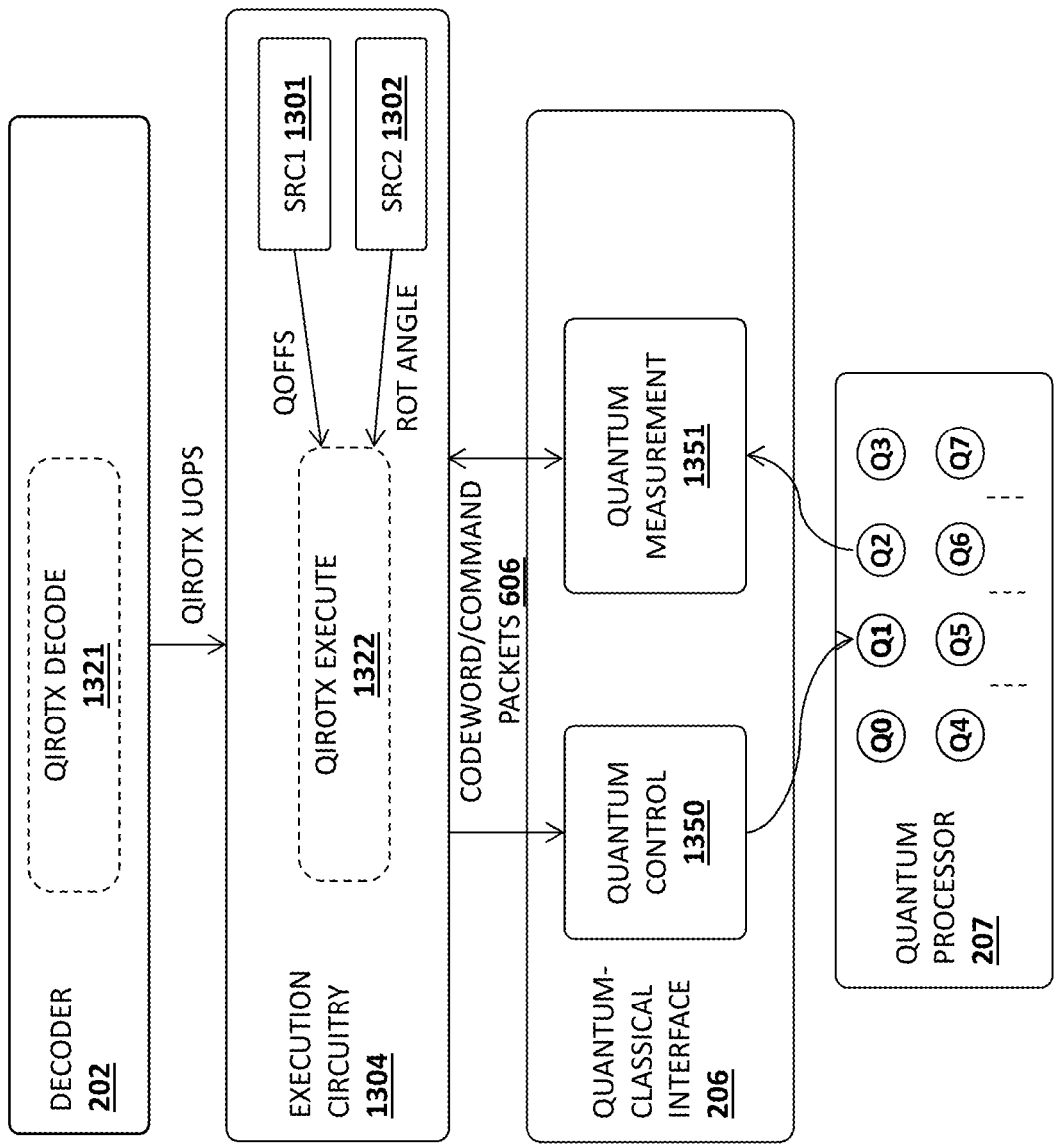
FIGS. 13A-B illustrate different embodiments for executing a rotation instruction specifying an arbitrary rotation value.

One embodiment of an architecture for processing the QIROTX instruction is illustrated in FIG. 13A. In this embodiment, a decoder 202 includes circuitry/microcode 1321 for decoding a QIROTX instruction and the execution circuitry 1304 includes QIROTX execution circuitry 1322 (e.g., one or more functional units) for executing the uops generated by the QIROTX decode circuitry/microcode 1321. As mentioned above, the execution circuitry 1304 of this embodiment includes functional units for executing both quantum instructions and non-quantum instructions. In this embodiment, a first source register SRC1 1301 stores the QOFFS value for identifying the physical qubit on which the rotation is performed and a second source register SRC2 1302 stores the angle of rotation to be applied to the qubit.

Figure 13B:
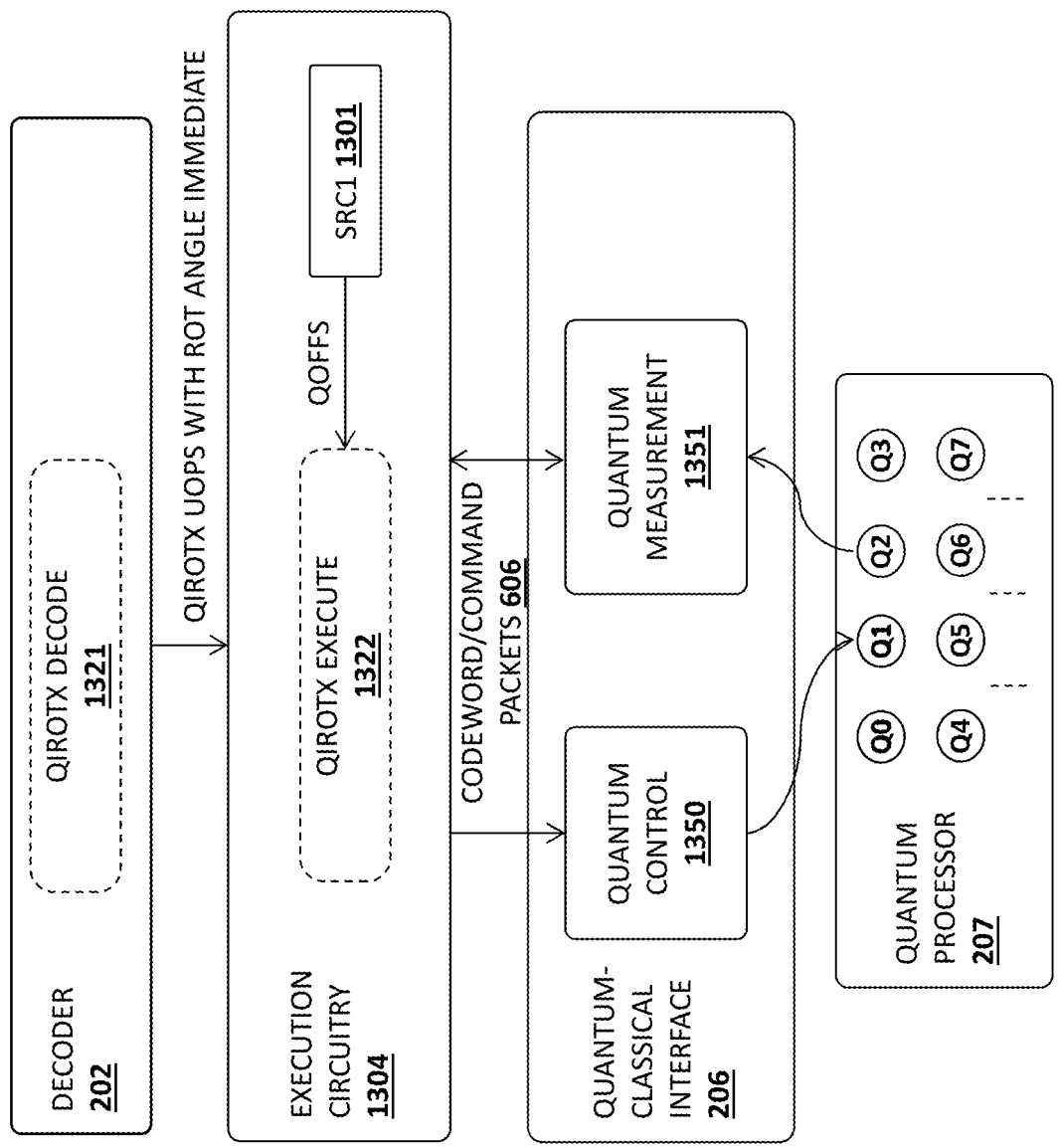

FIG. 13B illustrates an embodiment in which the rotation angle is encoded in an immediate of the QIROTX instruction. in this embodiment, the immediate value is passed through to the execution circuitry with the uops and only a single source register is used, SRC1 1301, for storing the QOFFS value for identifying the physical qubit on which the rotation is performed.

The following illustration on how the rotation angle is encoded in QIROTX instruction source operand assumes a 64-bit implementation (e.g., QIROTX qoffs64, r64/imm64). However, the underlying principles described here are easily ported to a 32-bit implementation. In one embodiment, the angle to be rotated is $\pi/r64[63:0]$ if $r64[63]==0$ and is $-\pi/\text{twos\_complement}(r64[63:0])$ if $r64[63]==1$.

In the instruction QIROTX [RDI], R10, if register RDI contains 5 and register R10 contains 1, an X gate is applied to qubit 5. If register RDI contains 5 and register R10 contains $2^{64}-2$, $R_x(-\pi/2)$ is applied to qubit 5

The difficulty is supporting all of the different waveform/pulse shapes for different rotation amounts. It is not reasonable to store $2^{32}$ or $2^{64}$ waveform/pulse shapes on the chip. To address this problem, one embodiment stores $2^{16}$ waveform/pulse shapes on the chip. While this is a very large, it is still manageable on current architectures. In one embodiment, the precision limiter resides in the RF/analog circuitry of the quantum control circuitry 1350 and the combined integrated RF and analog circuit precision is approximately 16 bits on currently envisioned RF/analog architectures. Thus, the $2^{16}$ value is appropriate and provides a sufficient level of precision for these architectures. The integrated RF/analog circuit precision may improve over time but will likely take years.

In another embodiment, only 2N+1 waveform shapes/pulses are stored, in accordance with the following sequence: $\pi$, $\pm\pi/2$, $\pm\pi/4$, $\pm\pi/8$, $\pm\pi/16$ ... $\pm\pi/2^N$. For example, 33 waveform shapes/pulses may be stored, in accordance with the sequence: $\pi$, $\pm\pi/2$, $\pm\pi/4$, $\pm\pi/8$, $\pm\pi/16$ ... $\pm\pi/2^{16}$. An arbitrary rotation is then approximated by performing a binary search for the nearest match. In particular, different combinations of these values may be combined via a binary search to identify one particular combination which is closest to the desired rotation value. For example, the rotation $\pi/3$ may be approximated by combining $\pi/4+\pi/16+\pi/64+\pi/256$ ... etc., which results in an angle error of $\pi/(3*256)=\pi/768$ which may be an acceptable level of precision.

Approximating arbitrary single-qubit rotations to within a distance of $10^{-6}$ is sufficient for many quantum algorithms. With this architecture, a quantum co-processor or integrated quantum processor may be designed with low precision rotation support to meet requirements of these algorithms. As control electronics becomes more capable, the rotation precision of the quantum co-processor or integrated quantum processor may be increased accordingly.

Figure 14:
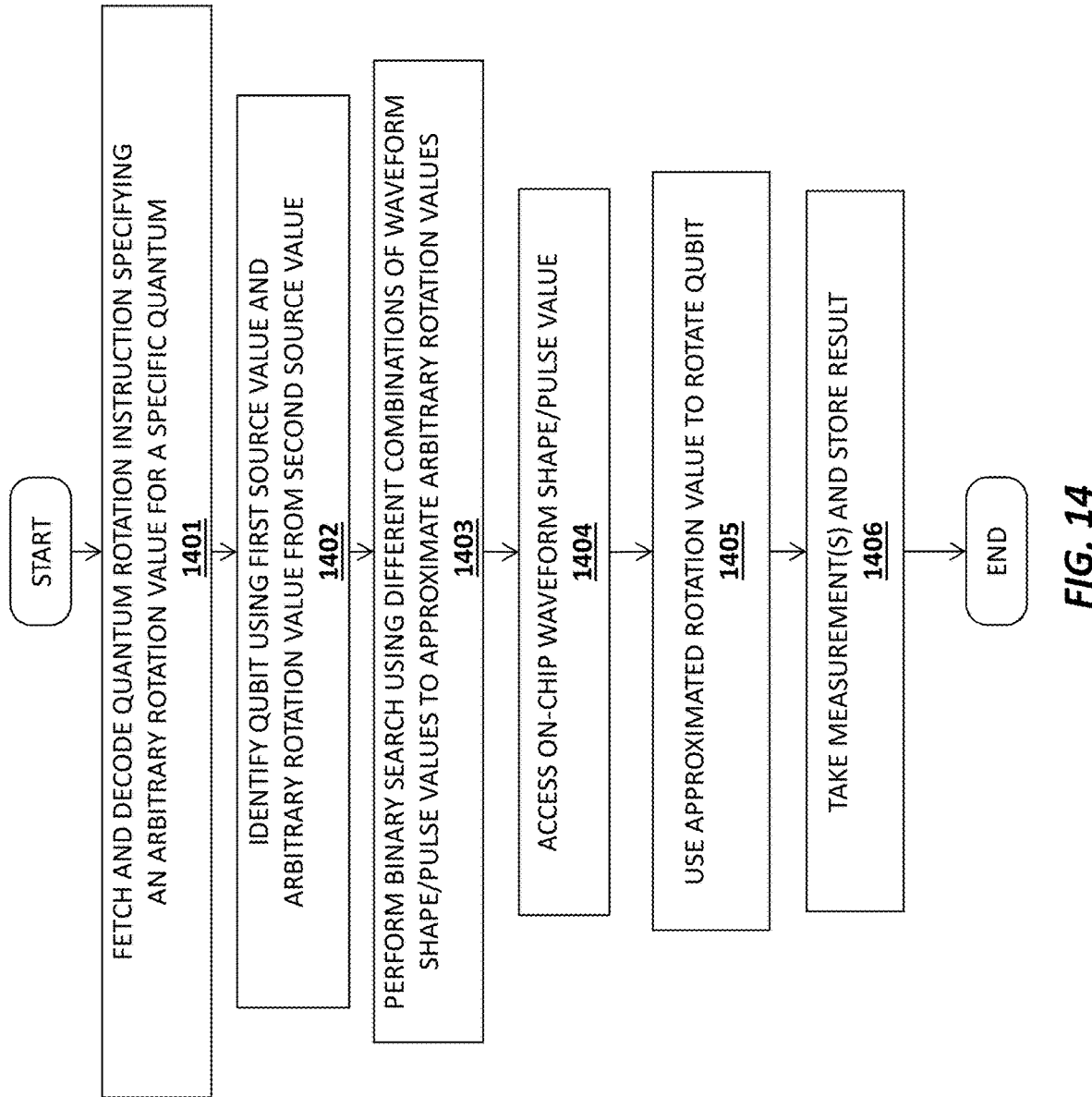
FIG. 14 illustrates a method for performing an arbitrary qubit rotation using an approximation.

A computer-implemented method in accordance with one embodiment of the invention is illustrated in FIG. 14. While this method may be implemented on the processor and system architectures described above, it is not limited to any particular system architecture.

At 1401 a quantum rotation instruction which specifies an arbitrary rotation value is fetched and decoded. At 1402, a qubit is identified using a first source value and an arbitrary rotation value is identified from a second source value. For example, the first source value may be included as a first operand of the quantum rotation instruction and the second source value may be included as a second operand and/or immediate of the quantum rotation instruction. At 1403, a binary search is performed using different combinations of waveform shape/pulse values to approximate the arbitrary rotation and, at 1404, on-chip waveform shape/pulse values are accessed. The binary search may be performed by functional units within the execution circuitry as described above. At 1405, the approximated rotation values are used to rotate the qubit and at 1406, a measurement is taken (potentially after additional qubit operations) to measure a current state of one or more qubits and store resulting values within registers of a register file.

Apparatus and Method Including Scalable Representations of Arbitrary Quantum Computing Rotations Very often, quantum circuits for real-world applications such as material design can be parameterized. An example of parameterized quantum circuit is shown in FIG. 15 where quantum operations are specified based on the parameters w, $\tau$, $h_0^x$, $h_0^z$, $h_1^x$, and $h_1^z$ to implement a cNOT operation on qubits q0 and q1. For example, the line of code $R_x(2wh_0^x\tau)$ q0 (labeled 1501) relies on the calculated value $2wh_0^x\tau$ to perform a rotation on qubit q0.

The embodiments of the invention described below enable a quantum computer to execute parameterized quantum circuits in a flexible, scalable manner. Quantum computing systems today have been primarily designed and implemented to deal with instructions with fixed parameters (e.g., $R_x(\pi)$, $R_x(\pi/2)$). While Delft's Quantum Infinity compiles a circuit into different binaries for different input parameter sets, this approach causes the binary size to grow exponentially. For example, in FIG. 15, $h_j^x$, $h_j^z$ are random real numbers in $[-1,1]$ and j indexes qubits.

In contrast, the embodiments of the invention prevent exponential binary growth by turning quantum circuits into subroutines which accept input parameters. A quantum system implemented in accordance with these techniques provides far greater flexibility because it does not require statically-compiled quantum programs in which the operands of instructions (e.g., the precise values to be used for a rotation) are all computed at compile time. In addition, these embodiments provide programmers with an easily accessible instruction set mechanism to tightly mix and exchange data between classical computations and quantum gates.

To execute parameterized quantum circuits, one embodiment of the invention uses floating point (FP) data to describe rotations. In particular, a general purpose processor or special purpose processor with a microarchitecture supporting floating point operations is used to determine a rotation value from the input parameters. While this specific implementation is used to illustrate the operation and benefits of one embodiment of the invention, it should be noted that the underlying principles of the invention are not limited to this implementation.

Figure 16:
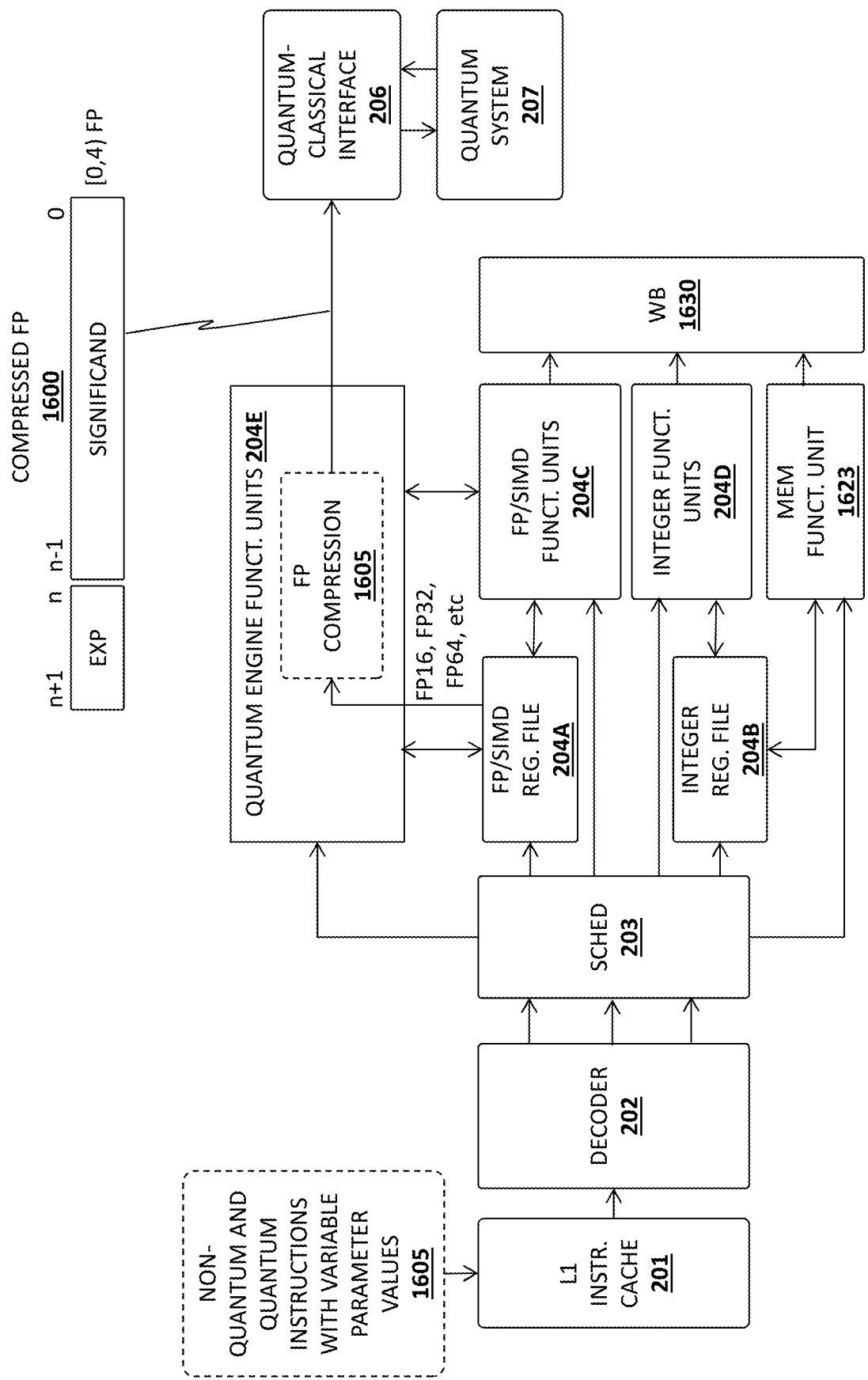
FIG. 16 illustrates one embodiment of an architecture for calculating and using floating point values for qubit rotations.

FIG. 16 illustrates one embodiment of an architecture for implementing the techniques described herein. Instructions 1605 associated with quantum operations and non-quantum operations are read by a decoder 202 from the L1 instruction cache 201 (or directly from memory). Many of these instructions will use parameters determined at runtime as the result of prior instruction executions. A scheduler 203 schedules uops generated by the decoder 202 for execution on FP/SIMD functional units 204C and quantum engine functional units 204E using values stored in the FP/SIMD register file 204 and schedules uops on the integer functional units 204D and/or memory functional units 1623 using values stored in an integer register file 204B. A writeback unit 1630 either updates the architectural state with the results or (in the case of a conflict or other type of exception) discards the results and causes the pipeline to roll back to a prior architectural state.

As mentioned, instructions executed by the various functional units require source operands, many of which comprise values generated by prior instructions. Each such parameter value is stored in a register within one of the register files 204A-B. For example, in one embodiment, the rotation value of $2wh_0^x\tau$ is generated by a first set of one or more instructions (e.g., a series of multiplication operations) and stored in one of the FP registers 204A, e.g., fp3. Upon receiving a quantum rotation uop (or multiple uops specifying quantum rotation), the quantum engine functional unit(s) 204E to which the uop has been dispatched reads the floating point value from fp3 to generate the rotation results. For example, given the operation $R_x(wh_0^x\tau)$ q0 described above, once the value $2wh_0^x\tau$ has been determined and stored in fp3, an instruction such as $R_x$ q0,fp3 may be executed to rotate q0 around the x-axis by the amount specified in fp3. In response to the rotation instruction, the quantum engine functional unit(s) 204E responsively transmits commands to the quantum-classical interface 206 which generates sequences of pulses to control the state of the quantum processor 207. Once the quantum processor 207 has reached a specified execution state, quantum measurements are taken by one or more of the measurement discrimination units (MDUs) 403A-B.

As indicated in FIG. 16, various floating point precisions may be used to store floating point data including half (FP16), single (FP32), double (FP64), and/or quad (FP128). This data is moved from the classical side to the quantum side when a quantum instruction executed on the quantum engine functional unit(s) 204E references a floating point register 204A.

In one embodiment, floating point compression circuitry/logic 1605 (hereinafter "FP compressor 1605") compresses the FP value to a size which is sufficient for performing the required quantum operations. FIG. 16 illustrates one example of a compressed FP value 1600 with an n-bit significand and a 2-bit exponent. With qubit rotation period $4\pi$, one embodiment of the FP compressor 1605 compresses the FP value to [0,4) in qubit control precision (exponent with the zero offset being 2) as the data is moved from the classical side to the quantum side. It has been determined that the value n=10 is sufficient in at least some implementations (i.e., using a 10-bit significand). However, various other exponent and significand sizes may be used.

Regardless of the specific number of bits or data format used, the compressed FP value may be processed in different ways to implement the rotation, based on the configuration of the quantum-classical interface 206 and/or the quantum system 207. For example, in one embodiment, the compressed FP value is mapped to a codeword to control a codeword triggered pulse generation (CTPG) unit 402A-C. In another embodiment, the compressed FP value is used to identify and/or scale one or more waveforms stored in memory to perform the rotation at the required precision. The compressed FP value may be used in other ways to perform the rotation operation in accordance with the underlying principles of the invention.

Figure 17:
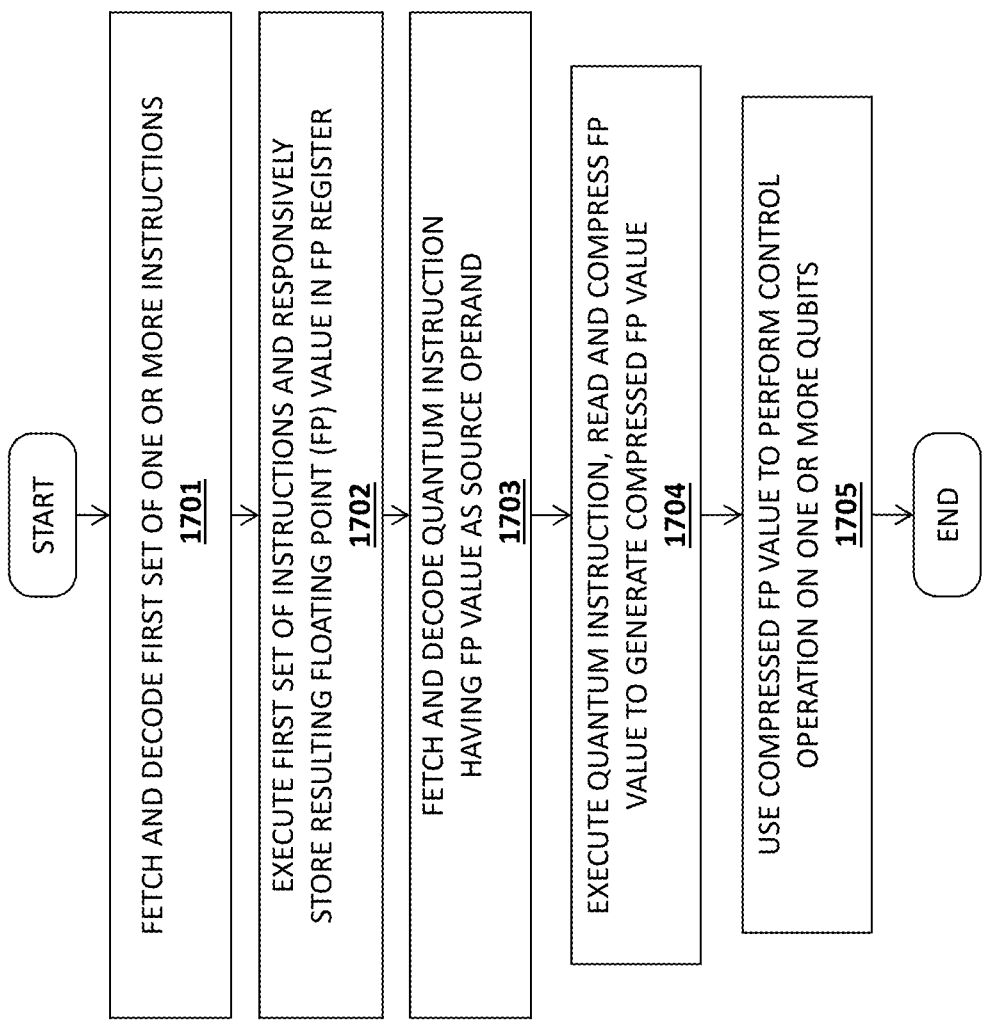
FIG. 17 illustrates a method for performing qubit rotations in accordance with one embodiment of the invention.

A method in accordance with one embodiment of the invention is illustrated in FIG. 17. The method may be implemented within the context of the architectures described above but is not limited to any particular architecture.

At 1701, a first set of one or more instructions are fetched and decoded and, at 1702, the set of instructions are executed to generate a floating point result, which is stored in one of the FP registers of the FP register file. At 1703, a quantum instruction is fetched and decoded which identifies the FP value in a source operand. At 1704, the quantum instruction is executed and the FP value is read from the FP register and compressed in accordance with the configuration of the quantum system and/or the classical-quantum interface. In one embodiment, the size of the compressed FP value is selected to provide a sufficient level of precision for performing the specified quantum operation. At 1705, the compressed FP value is used to perform control operation on one or more qubits of the quantum system (e.g., such as a rotation as described above).

Single qubit operations rotate qubit state on the Bloch sphere and are typically realized by microwaves that generate the necessary driving field. Generally, varying the amplitude of microwaves realizes arbitrary angles physically.

Apparatus and Method Supporting Arbitrary Angles with Qubit Personalities

As mentioned, single qubit operations rotate a qubit state on the Bloch sphere and are often realized by microwaves that generate the necessary driving field. Generally, varying the amplitude of microwaves realizes arbitrary angles physically. One embodiment of the invention supports arbitrary angles which equivalently require an infinite number of waveforms.

Some of these existing systems store waveforms in memory, where the waveform envelopes correspond to different angles which are mapped to indices in the memory. In addition, certain systems store a base envelope in memory which is then scaled by a set of scaling factors mapped to different angles. In particular, angles are mapped to indices which identify scaling factors in a lookup table. The base envelope is then scaled using the scaling factors.

However, the memory size limits the number of angles that can be supported by these architectures. Moreover, the scaling factor introduces unnecessary complexity and these systems lack any form of pre-compensation support.

Figure 18:
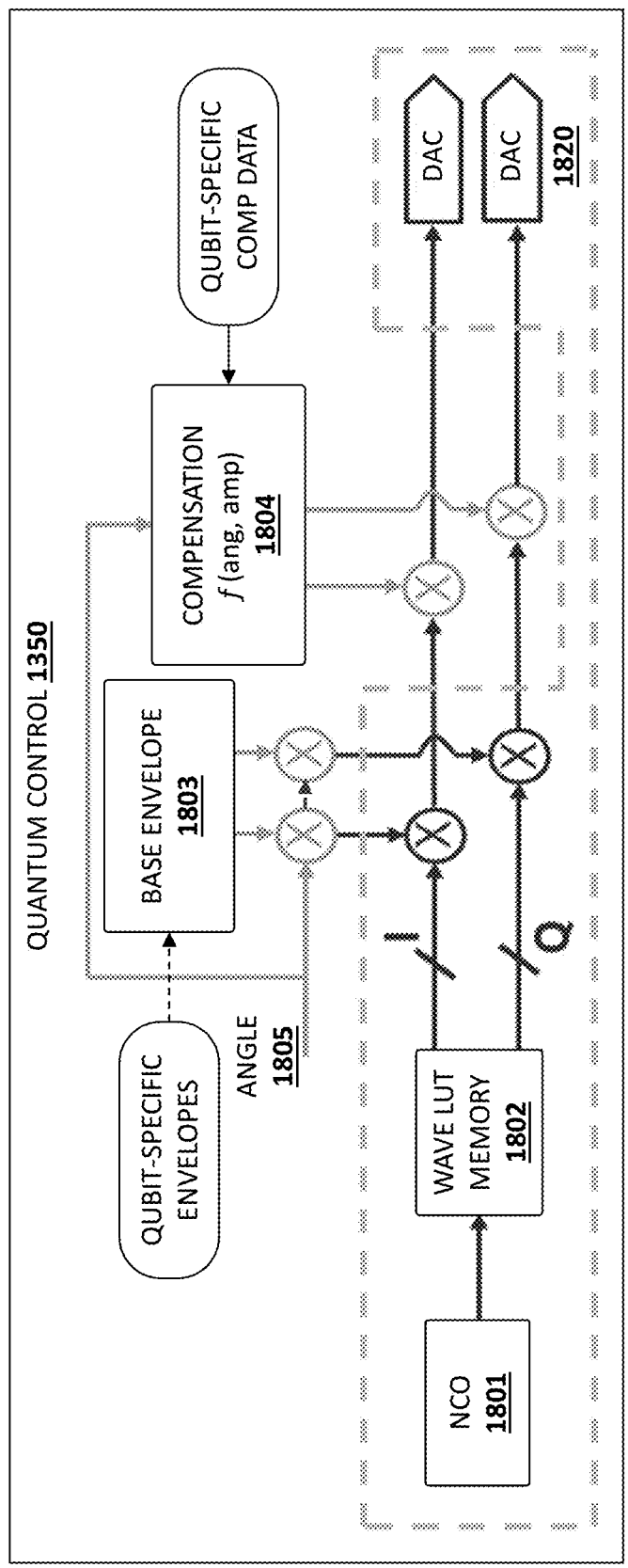
FIG. 18 illustrates one embodiment which provides a base envelope and a compensation envelope for each qubit.

One embodiment of the invention supports arbitrary rotation angles which equivalently require an infinite number of waveforms. FIG. 18 illustrates one particular embodiment of a quantum controller 1350 for generating such waveforms based on an input signal including a rotation angle 1805 provided from quantum gates and/or other instructions. In one embodiment, an entry from a wave lookup table (LUT) memory 1802 is selected based on the output of a numerically-controlled oscillator (NCO) 1801 (e.g., to specify a base frequency).

In-phase (I) and quadrature (Q) signal components are generated from the selected entry. In these embodiments, the LUT memory 1802 may be a read-only memory (ROM), a non-volatile programmable memory device such as a Flash memory, or any other form of memory device capable of storing the I/Q specifications.

In one embodiment, a base envelope generator 1803 produces a waveform to shape the input rotation angle 1805 (e.g., via a set of mixers as illustrated). In one implementation, the base envelope generator 1803 may select a different base envelope depending on the specific qubit on which the rotation is to be performed. For example, qubit-specific envelopes may be collected and stored based on prior results, and used by the base envelope 1803 is tuned to provide qubit-specific envelopes to maximize gate fidelities in view of the unique characteristics of qubits. In addition, unlike existing systems, the rotation angles 1805 specified from gates or instructions are used to scale the base envelope directly.

After shaping by the envelope generator, the resulting I and Q components are mixed with signal components produced by compensation circuitry 1804. In this embodiment, the compensation circuitry 1804 implements another envelope which compensates for distortions in the signal path to the target qubit. As with the envelope generator 1803, the compensation circuitry 1804 may be configured to implement a different compensation signal for each qubit using qubit-specific compensation data (e.g., based on detected distortions in the path to each qubit). Using this qubit-specific data, the compensation circuitry 1804 compensates for amplitude-dependent coherent errors with specific angle and amplitude values (f(ang, amp)). The values for f(ang, amp) may be selected from another look-up table indexed by the angle value 1805 or as a function generator.

Using the embodiment illustrated in FIG. 18, a qubit which has some uniqueness may be uniquely controlled by the base envelope generator 1803 and the compensation circuitry 1804 (e.g., using different types of qubit-specific compensation data). In addition, each qubit may be associated with another envelope which compensates for distortions in its signal path. Specifically, in this embodiment, the compensation values 1804 are selected to compensate for amplitude-dependent coherent errors, using angle and amplitude values (f(ang, amp)).

The embodiments of the invention allow for parameterization of quantum instructions, preventing code size explosion by turning quantum circuits into subroutines accepting input parameters. Using these techniques avoids the limitations of statically compiled quantum programs in which the instruction operands are all computed at compile time. Moreover, the above-described embodiments provide programmers with a familiar ISA-based mechanism to tightly mix classical computation and quantum gates, and pass data between these two worlds.

In the above detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments. Terms like "first," "second," "third," etc. do not imply a particular ordering, unless otherwise specified.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

EXAMPLES

The following are example implementations of different embodiments of the invention.

Example 1. An apparatus comprising: a decoder to decode a plurality of instructions; execution circuitry to execute a first instruction or first set of the instructions to generate a floating point (FP) value and to store the FP value in a first register; the execution circuitry to execute a second instruction or second set of the one or more of the instructions to read the FP value from the first register and compress the FP value to generate a compressed FP value having a precision selected for performing quantum rotation operations; and quantum interface circuitry to process the compressed FP value to cause a quantum rotation to be performed on one or more qubits of a quantum processor.

Example 2. The apparatus of example 1 wherein the quantum interface circuitry is to use the compressed FP value to select and/or scale one or more waveforms stored in a memory to perform the rotation at the required precision.

Example 3. The apparatus of example 2 further comprising: a quantum controller comprising a quantum analog signal generator to generate analog waveforms in accordance with the selected and/or scaled waveforms stored in the memory.

Example 4. The apparatus of example 1 wherein the compressed FP value comprises a rotation value for the quantum rotation.

Example 5. The apparatus of example 4 wherein the first set of the instructions comprises one or more multiplication instructions to multiply a first parameter with a second parameter to produce the FP value comprising an uncompressed rotation value to be compressed by the second one or more instructions to generate the compressed FP value comprising a compressed rotation value.

Example 6. The apparatus of example 1 wherein the FP value comprises a single-precision FP value and the compressed FP value includes a 2-bit exponent.

Example 7. The apparatus of example 6 wherein the compressed FP value comprises a 10 bit significand.

Example 8. The apparatus of example 1 further comprising: a scheduler to schedule the first set of the instructions for execution on one or more floating point execution units and to schedule the second set of the instructions for execution on one or more quantum engine functional units, the quantum engine functional units coupled to the quantum interface circuitry.

Example 9. A method comprising: decoding a plurality of instructions; executing a first instruction or first set of the instructions to generate a floating point (FP) value and to store the FP value in a first register; executing a second instruction or a second set of the instructions to read the FP value from the first register and compress the FP value to generate a compressed FP value having a precision selected for performing quantum rotation operations; and processing the compressed FP value to cause a quantum rotation to be performed on one or more qubits of a quantum processor.

Example 10. The method of example 9 wherein processing the compressed FP value comprises using the compressed FP value to select and/or scale one or more waveforms stored in a memory to perform the rotation at the required precision.

Example 11. The method of example 10 further comprising: generating analog waveforms in accordance with the selected and/or scaled waveforms stored in the memory.

Example 12. The method of example 9 wherein the compressed FP value comprises a rotation value for the quantum rotation.

Example 13. The method of example 12 wherein the first set of the instructions comprises one or more multiplication instructions to multiply a first parameter with a second parameter to produce the FP value comprising an uncompressed rotation value to be compressed by the second one or more instructions to generate the compressed FP value comprising a compressed rotation value.

Example 14. The method of example 9 wherein the FP value comprises a single-precision FP value and the compressed FP value includes a 2-bit exponent.

Example 15. The method of example 14 wherein the compressed FP value comprises a 10 bit significand.

Example 16. The method of example 9 further comprising: scheduling the first set of the instructions for execution on one or more floating point execution units; and scheduling the second set of the instructions for execution on one or more quantum engine functional units.

Example 17. A machine-readable medium having program code stored thereon which, when executed by a machine, causes the machine to perform the operations of: decoding a plurality of instructions; executing a first instruction or first set of the instructions to generate a floating point (FP) value and to store the FP value in a first register; executing a second instruction or a second set of the instructions to read the FP value from the first register and compress the FP value to generate a compressed FP value having a precision selected for performing quantum rotation operations; and processing the compressed FP value to cause a quantum rotation to be performed on one or more qubits of a quantum processor.

Example 18. The machine-readable medium of example 17 wherein processing the compressed FP value comprises using the compressed FP value to select and/or scale one or more waveforms stored in a memory to perform the rotation at the required precision.

Example 19. The machine-readable medium of example 18 further comprising program code to cause the machine to perform the operations of: generating analog waveforms in accordance with the selected and/or scaled waveforms stored in the memory.

Example 20. The machine-readable medium of example 17 wherein the compressed FP value comprises a rotation value for the quantum rotation.

Example 21. The machine-readable medium of example 20 wherein the first set of the instructions comprises one or more multiplication instructions to multiply a first parameter with a second parameter to produce the FP value comprising an uncompressed rotation value to be compressed by the second one or more instructions to generate the compressed FP value comprising a compressed rotation value.

Example 22. The machine-readable medium of example 17 wherein the FP value comprises a single-precision FP value and the compressed FP value includes a 2-bit exponent.

Example 23. The machine-readable medium of example 22 wherein the compressed FP value comprises a 10 bit significand.

Example 24. The machine-readable medium of example 17 further comprising program code to cause the machine to perform the operations of: scheduling the first set of the instructions for execution on one or more floating point execution units; and scheduling the second set of the instructions for execution on one or more quantum engine functional units.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
a decoder to decode a plurality of instructions;
execution circuitry to execute a first instruction or set of instructions to generate a floating point (FP) value and to store the FP value in a first register;
the execution circuitry to execute a second instruction or set of instructions to read the FP value from the first register and compress the FP value to generate a compressed FP value having a precision selected for performing quantum rotation operations; and
quantum interface circuitry to process the compressed FP value to cause a quantum rotation to be performed on one or more qubits of a quantum processor.

2. The apparatus of claim 1 wherein the quantum interface circuitry is to use the compressed FP value to select and/or scale one or more waveforms stored in a memory to perform the rotation at a required precision.

3. The apparatus of claim 2 further comprising:
a quantum controller comprising a quantum analog signal generator to generate analog waveforms in accordance with the selected and/or scaled waveforms stored in the memory.

4. The apparatus of claim 1 wherein the compressed FP value comprises a rotation value for the quantum rotation.

5. The apparatus of claim 4 wherein the first instruction or set of instructions comprises one or more multiplication instructions to multiply a first parameter with a second parameter to produce the FP value comprising an uncompressed rotation value to be compressed by the second instruction or set of instructions to generate the compressed FP value comprising a compressed rotation value.

6. The apparatus of claim 1 wherein the FP value comprises a single-precision FP value and the compressed FP value includes a 2-bit exponent.

7. The apparatus of claim 6 wherein the compressed FP value comprises a 10 bit significand.

8. The apparatus of claim 1 further comprising:
a scheduler to schedule the first instruction or set of instructions for execution on one or more floating point execution units and to schedule the second instruction or set of instructions for execution on one or more quantum engine functional units, the quantum engine functional units coupled to the quantum interface circuitry.

9. A method comprising:
decoding a plurality of instructions;
executing a first instruction or set of the instructions to generate a floating point (FP) value and to store the FP value in a first register;
executing a second instruction or set of the instructions to read the FP value from the first register and compress the FP value to generate a compressed FP value having a precision selected for performing quantum rotation operations; and
processing the compressed FP value to cause a quantum rotation to be performed on one or more qubits of a quantum processor.

10. The method of claim 9 wherein processing the compressed FP value comprises using the compressed FP value to select and/or scale one or more waveforms stored in a memory to perform the rotation at a required precision.

11. The method of claim 10 further comprising:
generating analog waveforms in accordance with the selected and/or scaled waveforms stored in the memory.

12. The method of claim 9 wherein the compressed FP value comprises a rotation value for the quantum rotation.

13. The method of claim 12 wherein the first instruction or set of instructions comprises one or more multiplication instructions to multiply a first parameter with a second parameter to produce the FP value comprising an uncompressed rotation value to be compressed by the second instruction or set of instructions to generate the compressed FP value comprising a compressed rotation value.

14. The method of claim 9 wherein the FP value comprises a single-precision FP value and the compressed FP value includes a 2-bit exponent.

15. The method of claim 14 wherein the compressed FP value comprises a 10 bit significand.

16. The method of claim 9 further comprising:
scheduling the first instruction or set of instructions for execution on one or more floating point execution units; and
scheduling the second instruction or set of instructions for execution on one or more quantum engine functional units.

17. A non-transitory machine-readable medium having program code stored thereon which, when executed by a machine, causes the machine to perform operations of:
decoding a plurality of instructions;
executing a first instruction or set of instructions to generate a floating point (FP) value and to store the FP value in a first register;
executing a second instruction or set of instructions to read the FP value from the first register and compress the FP value to generate a compressed FP value having a precision selected for performing quantum rotation operations; and
processing the compressed FP value to cause a quantum rotation to be performed on one or more qubits of a quantum processor.

18. The non-transitory machine-readable medium of claim 17 wherein processing the compressed FP value comprises using the compressed FP value to select and/or scale one or more waveforms stored in a memory to perform the rotation at a required precision.

19. The non-transitory machine-readable medium of claim 18 further comprising program code to cause the machine to perform the operations of:
generating analog waveforms in accordance with the selected and/or scaled waveforms stored in the memory.

20. The non-transitory machine-readable medium of claim 17 wherein the compressed FP value comprises a rotation value for the quantum rotation.

21. The non-transitory machine-readable medium of claim 20 wherein the first instruction or set of instructions comprises one or more multiplication instructions to multiply a first parameter with a second parameter to produce the FP value comprising an uncompressed rotation value to be compressed by the second instruction or set of instructions to generate the compressed FP value comprising a compressed rotation value.

22. The non-transitory machine-readable medium of claim 17 wherein the FP value comprises a single-precision FP value and the compressed FP value includes a 2-bit exponent.

23. The non-transitory machine-readable medium of claim 22 wherein the compressed FP value comprises a 10 bit significand.

24. The non-transitory machine-readable medium of claim 17 further comprising program code to cause the machine to perform the operations of:
scheduling the first instruction or set of instructions for execution on one or more floating point execution units; and
scheduling the second instruction or set of instructions for execution on one or more quantum engine functional units.

* * * * *